US012091106B2

(12) United States Patent
Nichols et al.

(10) Patent No.: US 12,091,106 B2
(45) Date of Patent: Sep. 17, 2024

(54) METHODS AND APPARATUS TO CENTER A STEERING WHEEL AND MOVE ROAD WHEELS TO A STRAIGHTLY FORWARD POSITION

(71) Applicant: Ford Global Technology, LLC, Dearborn, MI (US)

(72) Inventors: Daniel James Nichols, Northville, MI (US); William James Bouse, Ann Arbor, MI (US); Justin Sekula, Berkley, MI (US); Alex Parker, Novi, MI (US); Zhongzhou Yang, Novi, MI (US); Timothy Panagis, Ypsilanti, MI (US); Zheng Tan, Livonia, MI (US); Bo Lin, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 212 days.

(21) Appl. No.: 17/734,912

(22) Filed: May 2, 2022

(65) Prior Publication Data

US 2022/0289270 A1 Sep. 15, 2022

Related U.S. Application Data

(63) Continuation-in-part of application No. 17/201,312, filed on Mar. 15, 2021.

(51) Int. Cl.
*B62D 5/04* (2006.01)
*B60W 60/00* (2020.01)
*B62D 15/02* (2006.01)

(52) U.S. Cl.
CPC ........... *B62D 5/046* (2013.01); *B60W 60/001* (2020.02); *B62D 15/0215* (2013.01);
(Continued)

(58) Field of Classification Search
CPC .............. B62D 5/046; B62D 15/0215; B62D 15/0225; B62D 15/0235; B60W 60/001; B60W 2510/20
See application file for complete search history.

(56) References Cited

U.S. PATENT DOCUMENTS 8,406,958 B2 3/2013 Kim
9,434,415 B2 9/2016 Lavoie
(Continued)

FOREIGN PATENT DOCUMENTS

CN 102897210 7/2016
DE 102009000244 7/2010
(Continued)

*Primary Examiner* — Mathew Franklin Gordon
(74) *Attorney, Agent, or Firm* — Lorne Forsythe; Hanley, Flight & Zimmerman, LLC

(57) ABSTRACT

Methods and apparatus are disclosed herein to center a steering wheel. An example vehicle includes a steering assistance system, an axle including a wheel, memory, and a processor to execute instructions to identify a first position of the wheel, detect a request to move the wheel to a second position, adjust the wheel from the first position to the second position via the steering assistance system, disengage the steering assistance system, the disengagement of the steering assistance system to cause the wheel to move to a third position, the third position offset from the second position by an angular offset in a first direction, adjust the wheel to a fourth position, the fourth position offset from the second position by the angular offset in a second direction different than the first direction, and disengage the steering assistance system, the disengagement of the steering assistance system to cause the wheel to move to the second position.

20 Claims, 19 Drawing Sheets

(52) U.S. Cl.
CPC ..... *B62D 15/0225* (2013.01); *B62D 15/0235* (2013.01); *B60W 2510/20* (2013.01)

(56) References Cited

U.S. PATENT DOCUMENTS

| | | |
|---|---|---|
| 10,053,149 B1 | 8/2018 | Christiansen |
| 10,676,121 B2 | 6/2020 | Lubischer et al. |
| 2020/0361530 A1 | 11/2020 | Polmans et al. |

FOREIGN PATENT DOCUMENTS

| | | |
|---|---|---|
| KR | 101796915 | 11/2017 |
| KR | 20190026299 | 3/2019 |

300 ↙  302

| Zone 1 Difference ||||||||||
|---|---|---|---|---|---|---|---|---|---|
| Target (deg) | 0 ||| 360 ||| -360 |||
| Approach from: | Either | Left | Right | Either | Left | Right | Either | Left | Right |
| Average | 1.17 | 1.19 | 1.15 | 2.86 | 2.86 | 2.86 | 2.13 | 2.02 | 2.48 |
| σ | 0.61 | 0.69 | 0.51 | 0.59 | 0.61 | 0.59 | 0.52 | 0.55 | 0.04 |
| Average + 3σ | 2.99 | 3.26 | 2.68 | 4.64 | 4.68 | 4.61 | 3.69 | 3.67 | 2.59 |

| Zone 2 Difference ||||||||||
|---|---|---|---|---|---|---|---|---|---|
| Target (deg) | 0 ||| 360 ||| -360 |||
| Approach from: | Either | Left | Right | Either | Left | Right | Either | Left | Right |
| Average | 32.12 | 31.81 | 32.42 | 26.99 | 19.57 | 31.94 | 30.53 | 35.93 | 14.32 |
| σ | 4.31 | 4.11 | 4.47 | 7.73 | 2.97 | 4.74 | 10.61 | 3.79 | 0.54 |
| Average + 3σ | 45.04 | 44.15 | 45.85 | 50.17 | 28.49 | 46.17 | 62.35 | 47.30 | 15.94 |

METHODS AND APPARATUS TO CENTER A STEERING WHEEL AND MOVE ROAD WHEELS TO A STRAIGHTLY FORWARD POSITION

RELATED APPLICATION

This patent arises from a continuation-in-part of U.S. patent application Ser. No. 17/201,312, (now U.S. Pat. No. 12,005,974) which was filed on Mar. 15, 2021. U.S. patent application Ser. No. 17/201,312 is hereby incorporated herein by reference in its entirety. Priority to U.S. patent application Ser. No. 17/201,312 is hereby claimed.

FIELD OF THE DISCLOSURE

This disclosure relates generally to vehicles and, more particularly, to methods and apparatus to center a steering wheel and move road wheels to a straightly forward position.

BACKGROUND

A steering wheel is configured to change a driving direction of a vehicle based on a rotation of the wheel in a particular direction. For example, a driver steering the wheel in a given direction causes a system of pivoted joints to interact, thereby transferring the motion of the steering wheel into a motion of one or more road wheels. Steering systems in use include rack and pinion systems as well as steering box systems. The rack and pinion system relies on a gear wheel (e.g., a pinion) at the base of the steering column that causes a rack to translate from side to side, propagating the motion to the road wheels. The steering-box system includes a worm gear, which can be used to move a drop arm linked by a track rod to a steering arm, resulting in the movement of the front wheels. Modern vehicle steering wheels can be configured to retract to allow additional cabin space.

SUMMARY

An example vehicle described herein includes a steering assistance system, an axle including a wheel, memory, and a processor to execute instructions to identify a first position of the wheel, detect a request to move the wheel to a second position, adjust the wheel from the first position to the second position via the steering assistance system, disengage the steering assistance system, the disengagement of the steering assistance system to cause the wheel to move to a third position, the third position offset from the second position by an angular offset in a first direction, adjust the wheel to a fourth position, the fourth position offset from the second position by the angular offset in a second direction different than the first direction, and disengage the steering assistance system, the disengagement of the steering assistance system to cause the wheel to move to the second position.

An example method described herein includes identifying a first position of a road wheel of a vehicle, detecting a request to move the road wheel to a second position, adjusting the road wheel from the first position to the second position via a steering assistance system, disengaging the steering assistance system, the disengagement of the steering assistance system to cause the road wheel to move to a third position, the third position offset from the second position by an angular offset in a first direction, adjusting the road wheel to a fourth position, the fourth position offset from the second position by the angular offset in a second direction different than the first direction, and disengaging the steering assistance system, the disengagement of the steering assistance system to cause the road wheel to move to the second position.

An example non-transitory computer readable storage medium disclosed herein includes instructions that, when executed, cause a processor to at least identify a first position of a road wheel of a vehicle, detect a request to move the road wheel to a second position, adjust the road wheel from the first position to the second position via a steering assistance system, disengage the steering assistance system, the disengagement of the steering assistance system to cause the road wheel to move to a third position, the third position offset from the second position by an angular offset in a first direction, adjust the road wheel to a fourth position, the fourth position offset from the second position by the angular offset in a second direction different than the first direction, and disengage the steering assistance system, the disengagement of the steering assistance system to cause the road wheel to move to the second position.

BRIEF DESCRIPTION OF THE DRAWINGS

FIG. 3A illustrates an example tabulated form of the steering position angle (SPA) difference of zone 1 as presented in connection with FIG. 2A.

FIG. 3B illustrates an example tabulated form of the steering position angle (SPA) difference of zone 2 as presented in connection with FIG. 2B.

The figures are not to scale. In general, the same reference numbers will be used throughout the drawing(s) and accompanying written description to refer to the same or like parts.

Figures 1A, 1B, 1C:
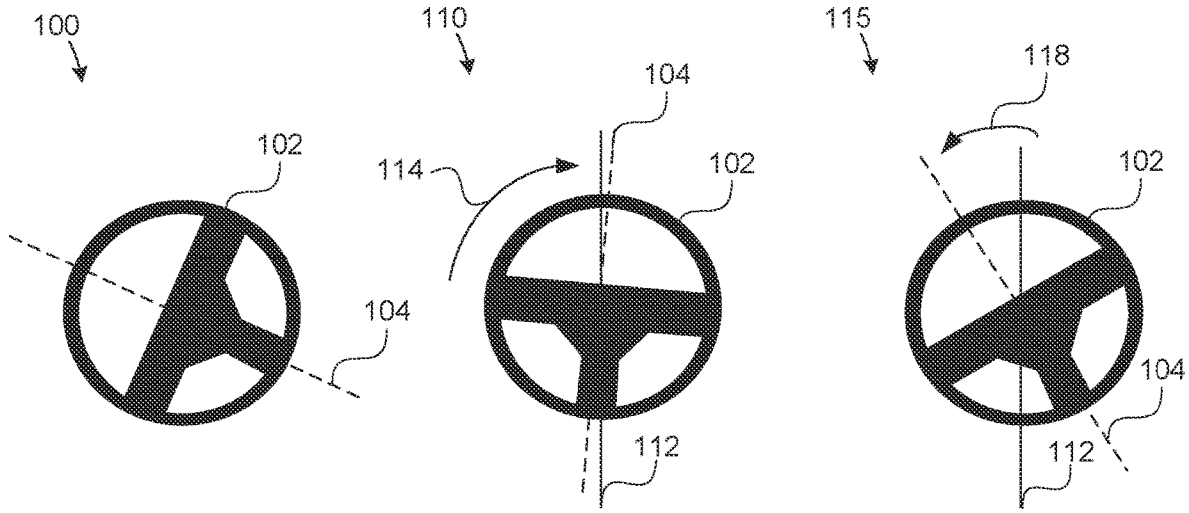
FIG. 1A illustrates an example first steering wheel position when the steering wheel has been turned by hand prior to being released.
FIG. 1B illustrates an example second steering wheel position when an external angle controller (EAC) is used to turn the steering wheel to a target steering position angle.
FIG. 1C illustrates an example third steering wheel position when steering assist is removed, causing the steering wheel to rebound.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections.

DETAILED DESCRIPTION

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

A stowable steering wheel can be used to provide additional room in a vehicle cabin for multiple uses. For example, a driver entering or exiting a vehicle can have additional space to maneuver. Power steering system components in addition to the steering wheel can include a steering column, a steering coupler, steering gear, and a power steering pump. Electric power steering systems, as compared to hydraulic systems, can include additional components such as sensors, actuators, motors, and an electronic control unit. Hydraulic power steering relies on hydraulic pressure supplied by an engine-driven pump. Electric power steering systems use an electric motor that is attached to the steering rack or the steering column, while the electronic control unit determines the steering dynamics.

Steering systems include rack and pinion systems as well as steering box systems. The rack and pinion system relies on a gear wheel (e.g., pinion) at the base of the steering column that causes a rack to translate from side to side, propagating the motion to the road wheels. For example, the pinion gear can be connected to a steering shaft such that as the steering wheel turns, the pinion gear rotates while moving the rack in a linear motion. As such, when the wheel is turned, the pinion gear rotates, moving the rack in a back-and-forth motion that turns the wheels left or right. In contrast to the rack and pinion system, the steering-box system includes a worm gear, which can be used to move a drop arm linked by a track rod to a steering arm, resulting in the movement of the front wheels.

In vehicles that include a stowable steering wheel, it is necessary to return a steering wheel position back to the center before steering is stowed. While the steering position can be returned to the center when actuators are providing forces to hold a steering position, it can be difficult to ascertain that steering is still centered when the actuators are no longer providing forces to hold the steering position. For example, the steering position may change due to residual forces associated with loads from tire deformation when actuators do not provide forces to hold and/or drive the steering position in the center.

Methods and apparatus disclosed herein can be used to center a steering wheel. In the examples disclosed herein, a steering position sensor in the steering column can be used to determine if the steering wheel is centered. For example, motors in electrical power steering can be used to change a steering position. An external angle controller (EAC) in electrical power steering can be used for the motor controller to change the steering angle. In the examples disclosed herein, when the steering angle is determined to be far from the center, the EAC can be used to rapidly move the steering wheel back to the center. Once the steering angle has reached zero (e.g., the wheel is centered), the EAC can be disabled to once again measure the steering angle. In some examples, a steering angle difference can be present after the EAC has been disabled (e.g., the steering wheel is off-center). In the examples disclosed herein, the steering angle difference from the center position (e.g., zero degrees) can be identified. By re-engaging the EAC, the steering angle can be ramped to an opposite of the identified angle difference (e.g., an offset of 10 degrees would result in the EAC ramping the steering wheel to −10 degrees). As such, the steering wheel can return to the center once the EAC is disabled, such that the steering wheel remains centered even when actuators have been disengaged (e.g., no longer providing forces to hold the steering position).

Some vehicles, like autonomous vehicles without steering wheels and/or vehicles with a steer-by-wire system, it can also be necessary to return the road wheels to a straightly-forward position. For examples, autonomous vehicles can benefit if the autonomous vehicles begin a new trip because trips often begin with a vehicle moving in a straight forward direction or straight backwards direction (e.g., leaving a parking space, etc.). In some examples, if the road wheels are not returned to straightly-forward direction, the difficulty of leaving a parking space increases. While the position of the road wheels can be returned to the straightly-forward position when actuators of the steering system are providing forces to hold the position of the steering system, the disengagement of the actuators can cause the position of the road wheels to change due to residual forces associated with loads from tire deformation.

Methods and apparatus disclosed herein enable the road wheels of a vehicle to be moved to a straightly-forward position. In some examples disclosed herein, sensors associated with a steering system can be used to determine a rotational position of the road wheels. In some examples disclosed herein, the EAC and/or another component of the steering system can be used to adjust the rotational position of the road wheels to a target position (e.g., the straightly-forward position, etc.). In some such examples, once the target position is reached and the EAC is disengaged, a recoil rotation causes the road wheels to move away from the target road wheel position. In some examples disclosed herein, by re-engaging the EAC, the rotational position of the road wheels can be moved to an opposite of the identified angle difference (e.g., an offset of 10 degrees would result in the EAC ramping the steering wheel to −10 degrees). In some examples disclosed herein, the road wheels can return to the target position once the EAC is disengaged, the recoil causes the road wheels to return to the straightly forward position. Additionally or alternatively, in some examples disclosed herein, the recoil rotation can be estimated based on feedback from the steering system. In some such examples, the EAC can move the road wheels directly to the opposite of the identified angle difference.

FIG. 1A illustrates an example first steering wheel position 100 when an example steering wheel 102 has been turned by hand prior to being released. In the example of FIG. 1A, the steering wheel 102 can be turned to the left of the center, resulting in an angle of approximately 40 degrees relative to the center (e.g., as defined using axis 104). FIG. 1B illustrates an example second steering wheel position 110 when an external angle controller (EAC) is used to turn the steering wheel 102 (e.g., as shown using example wheel repositioning 114) to an example target steering position angle (e.g., as defined using an axis 112). In the example of FIG. 1B, the EAC can be used to hold the steering wheel in position to permit measurement of a difference in the steering wheel position (e.g., identification of how far off-center the axis 104 of the steering wheel 102 is from the target steering position angle or center axis 112). In some examples, the difference can result from rubber deformation due to tire wind up. In some examples, the difference in steering wheel position can be determined by calculating tire deformation on a contact patch and a resulting spring back. FIG. 1C illustrates an example third steering wheel position 115 when steering assist is removed (e.g., EAC is disabled), causing the steering wheel 102 to rebound (e.g., as shown using example wheel rebound angle 118). In the example of FIG. 1C, the position of the axis 104 of the steering wheel 102 is determined relative to the target steering position angle (e.g., the center axis 112) to determine a difference in the actual position of the steering wheel 102 versus a desired position of the steering wheel 102 (e.g., centered such that the axis 104 overlaps the target steering position angle or center axis 112 in this example).

Figure 1D:
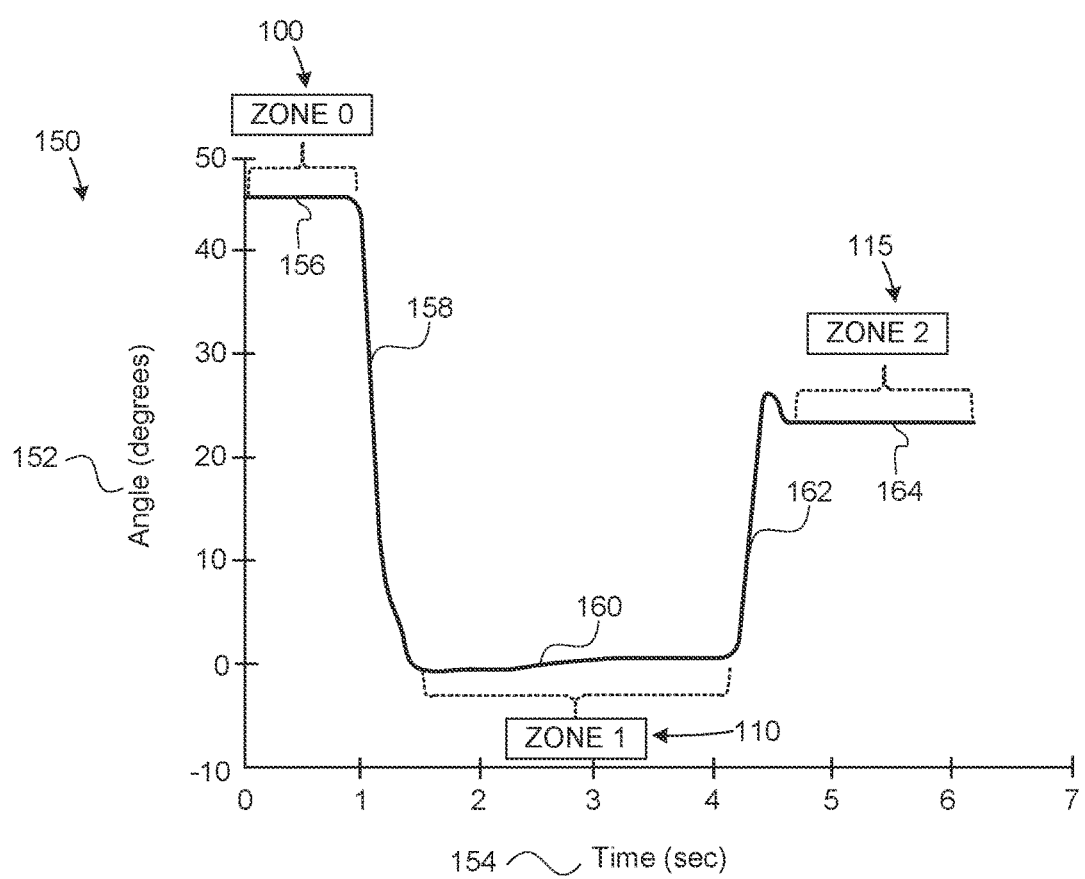
FIG. 1D is an example representation of a change in steering wheel angle over time as the steering wheel transitions from the first steering wheel position of FIG. 1A (e.g., zone 0) to the second steering wheel position of FIG. 1B (e.g., zone 1), and from the second steering wheel position of FIG. 1B (e.g., zone 1) to the third steering wheel position of FIG. 1C (e.g., zone 2).

FIG. 1D is an example representation 150 of a change in steering wheel angle 152 over example time 154 as the steering wheel 102 of FIGS. 1A, 1B, 1C transitions from the first steering wheel position 100 of FIG. 1A (e.g., zone 0) to the second steering wheel position 110 of FIG. 1B (e.g., zone 1), and from the second steering wheel position 110 of FIG. 1B (e.g., zone 1) to the third steering wheel position 115 of FIG. 1C (e.g., zone 2). In the example of FIG. 1D, the steering wheel 102 can be turned by hand to a starting position (e.g., first steering wheel position 100) prior to being released. In the example of FIG. 1D, the starting position of the steering wheel 102 is forty-five degrees from the center axis 112 (e.g., at zero degrees). In the first steering wheel position 100 (zone 0), the steering wheel 102 remains at the forty-five degree angle relative to the center axis 112 for approximately one second, as shown in the example first graph region 156. Once the external angle controller (EAC) is activated (e.g., example second graph region 158 as represented by the wheel repositioning 114 of FIG. 1B), the EAC returns the steering wheel 102 to the center axis 112 and holds the steering wheel 102 in position, as shown in the example third graph region 160 (e.g., zone 1 associated with the second steering wheel position 110). In some examples, a difference in the steering position angle can be determined by identifying whether the steering position angle is not aligned with the center axis 112. Once the steering assist is removed (e.g., the EAC is deactivated), the steering wheel 102 rebounds as shown in the example fourth graph region 162 (e.g., represented by the wheel repositioning 118 of FIG. 1C). Once electric power steering is no longer activated, the steering wheel 102 repositions to a steering wheel position angle (e.g., at axis 104) different from the center axis 112, as shown in the example fifth graph region 164 (e.g., zone 2 associated with the third steering wheel position 115). In the example of FIG. 1D, the steering wheel 102 is at approximately twenty-two degrees off-center relative to the center axis 112. The methods and apparatus disclosed herein permit the steering wheel 102 to be repositioned accurately to match the center axis 112 even in the absence of steering assist (e.g., independent of actuators that would otherwise be needed to hold the steering wheel 102 in position).

Figure 2A:
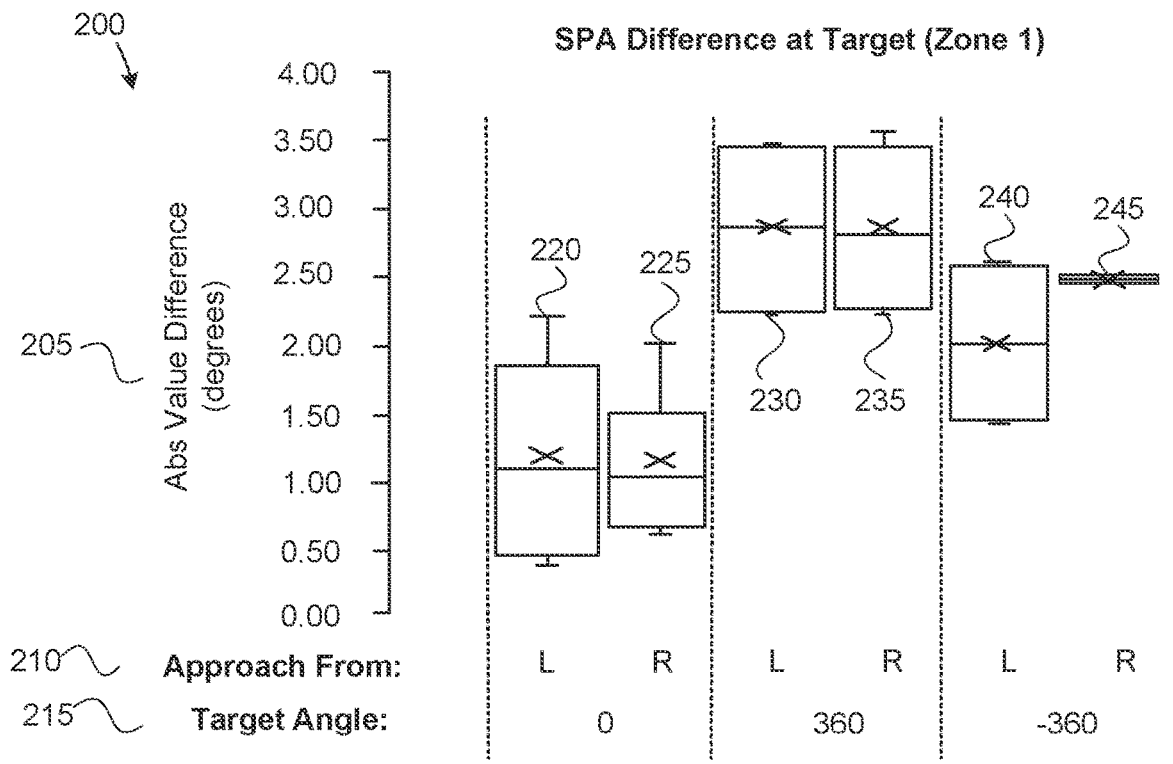
FIG. 2A illustrates example steering position angle (SPA) difference at the second steering wheel position of FIG. 1B (e.g., zone 1).

FIG. 2A illustrates an example steering position angle (SPA) difference 200 at the second steering wheel position 110 of FIG. 1B (e.g., zone 1). In the example of FIG. 2A, an absolute value difference 205 (in degrees) is determined based on a difference in the steering wheel position angle (e.g., defined by the steering wheel axis 104 of FIGS. 1B) and the target steering wheel position angle (e.g., defined by the center axis 112 of FIG. 1B). In some examples, the difference can result from rubber deformation due to tire wind up. In some examples, the difference in steering wheel position can be determined by calculating tire deformation on a contact patch and a resulting spring back. For example, after the steering wheel 102 has been turned by a user and the EAC has been engaged to reposition the steering wheel 102 back to the center axis 112, the difference 205 permits an evaluation of how far from the center axis 112 the steering wheel 102 is positioned. In the example of FIG. 2A, an example approach direction 210 can be from a left direction (L) or a right direction (R). For example, in the example of FIG. 1A, the steering wheel 102 is initially turned to the left prior to being repositioned towards the center axis 112 by the EAC. Likewise, the example target angle 215 can be set to 0 degrees, 360 degrees, and/or −360 degrees (e.g., as determined by testing conditions). The example box-and-whisker plot(s) 220, 225, 230, 235, 240, 245 of FIG. 2A illustrate data for steering position absolute value difference 205 at zone 1 (e.g., after the EAC has turned the steering wheel 102 back to the target steering angle). For example, the absolute value difference 205 is highest for a target angle 215 setting of 360 degrees (e.g., box-and-whisker plots 230, 235) and lowest for a target angle 215 setting of 0 degrees (e.g., box-and-whisker plots 220, 225) for both left (L) and right (R) approach directions 210.

Figure 2B:
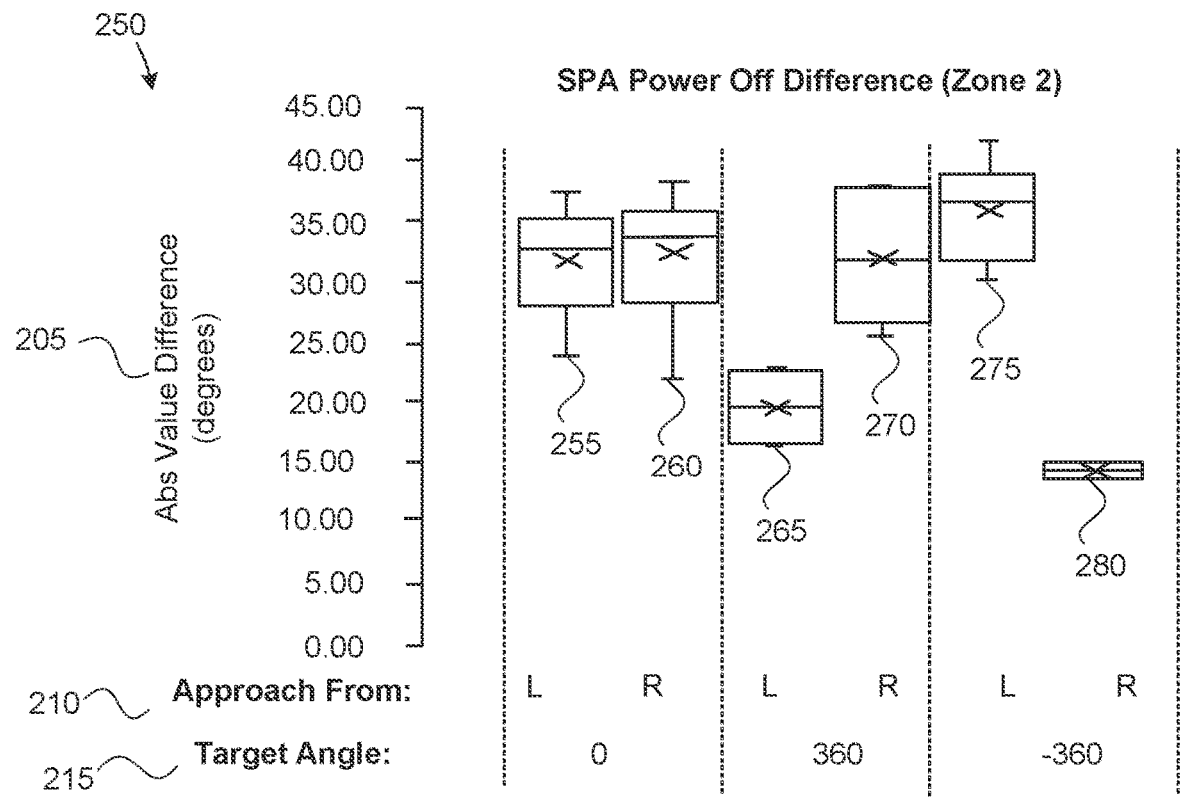
FIG. 2B illustrates example steering position angle (SPA) difference at the third steering wheel position of FIG. 1C (e.g., zone 2).

FIG. 2B illustrates an example steering position angle (SPA) difference 250 at the third steering wheel position 115 of FIG. 1C (e.g., zone 2). In the example of FIG. 2B, the absolute value difference 205 (in degrees) is determined based on a difference in the steering wheel position angle (e.g., defined by the steering wheel axis 104 of FIGS. 1C) and the target steering wheel position angle (e.g., defined by the center axis 112 of FIG. 1C). For example, after steering assist is removed (e.g., actuator(s) no longer engaged to keep the steering wheel 102 in position), the difference 205 permits an evaluation of how far from the center axis 112 the steering wheel 102 is positioned after the steering wheel 102 rebounds. In the example of FIG. 2B, the approach direction 210 can be from a left direction (L) or a right direction (R). Likewise, the target angle 215 can be set to 0 degrees, 360 degrees, and/or −360 degrees (e.g., as determined by testing conditions). The example box-and-whisker plot(s) 255, 260, 265, 270, 275, 280 of FIG. 2B illustrate data for steering position absolute value difference 205 at zone 1 (e.g., after power steering is no longer activated). For example, the absolute value difference 205 for a left-based approach direction 210 is highest for a target angle 215 setting of −360 degrees (e.g., box-and-whisker plot 275) and lowest for a target angle 215 setting of 360 degrees (e.g., box-and-whisker plot 265). In comparison, the absolute value difference 205 for a right-based approach direction 210 is highest for a target angle 215 setting of 0 and 360 degrees (e.g., box-and-whisker plots 260, 270) and lowest for a target angle 215 setting of −360 degrees (e.g., box-and-whisker plot 280).

FIG. 3A illustrates an example tabulated form 300 of the steering position angle (SPA) difference 200 of zone 1 as presented in connection with FIG. 2A. FIG. 3B illustrates an example tabulated form 350 of the steering position angle (SPA) difference 250 of zone 2 as presented in connection with FIG. 2B. In the example of FIGS. 3A and 3B, the collected data includes an example target angle 304 (in degrees) (e.g., 0, 360, −360 degrees), an example approach direction 306 (e.g., left, right, either), an example average difference 308, an example standard deviation 310 (σ), and an example sum 312 of the average difference 308 and three times the standard deviation 310 (σ). In the example of FIGS. 3A and 3B, the data includes zone 1 difference 302 (e.g., in connection with FIGS. 1B and 1D) and zone 2 difference 352 (e.g., in connection with FIGS. 1C and 1D), respectively. Based on the data presented in connection with FIGS. 2A-2B and FIGS. 3A-3B, it is apparent that the steering position angle difference 250 (e.g., zone 2 difference 352) is greater overall compared to the steering position angle difference 200 (e.g., zone 1 difference 302). As such, it is necessary to return the steering wheel 102 to a centered position (e.g., along the center axis 112). For example, a stowable steering wheel (e.g., steering wheel 102) may not be able to retract until it has been centered. Methods and apparatus disclosed herein address this challenge by determining (e.g., using a steering position sensor) if the steering wheel 102 is centered and correcting (e.g., using the EAC) the steering angle (e.g., aligning the steering position angle as defined by the steering wheel axis 104 with the center axis 112), as described in more detail in connection with FIG. 4.

Figure 4:
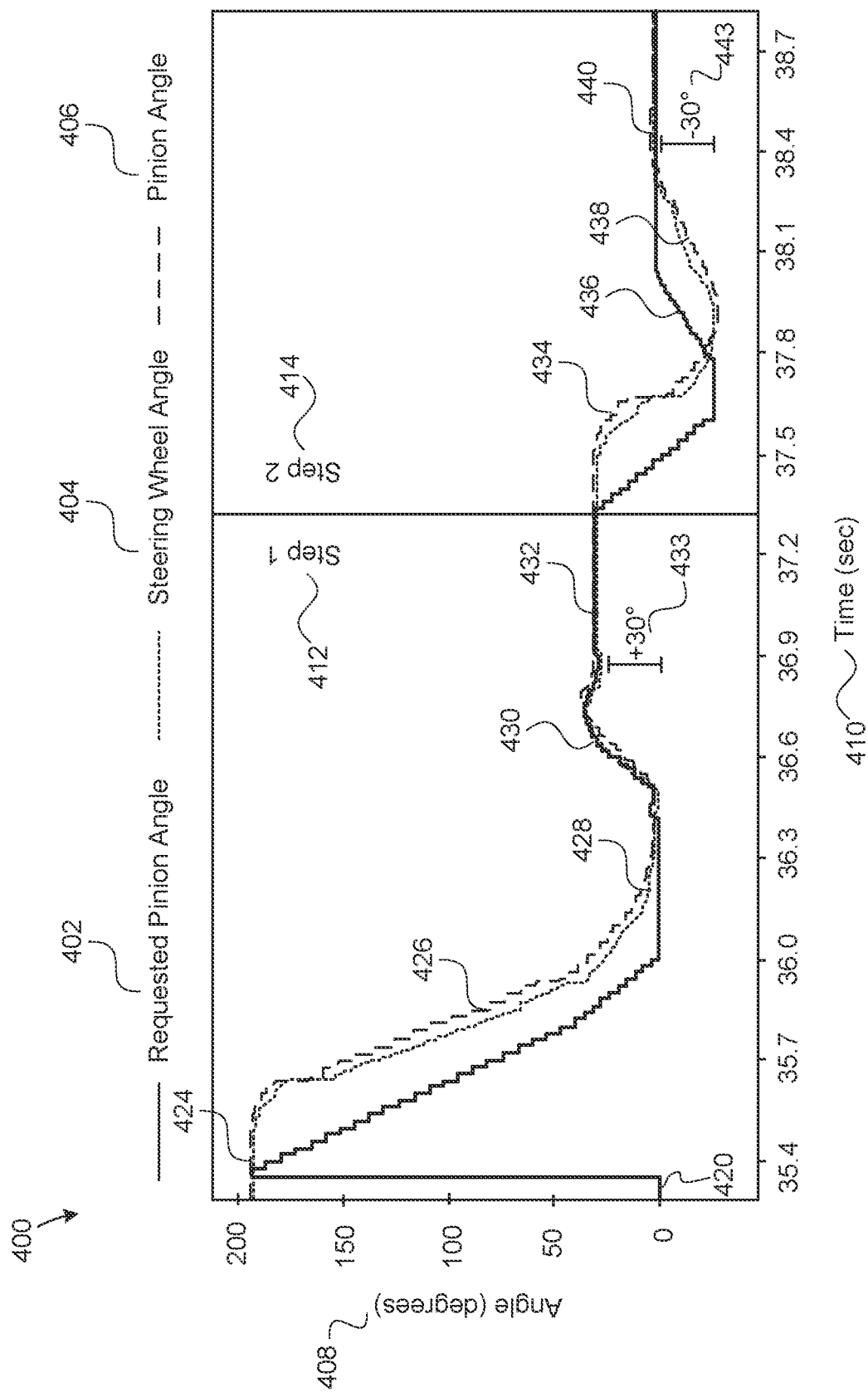
FIG. 4 is an example representation of changes in actual pinion angle, steering wheel angle, and requested pinion angle over time.

FIG. 4 is an example representation 400 of real-time measurements of an example requested pinion angle 402, an example steering wheel angle 404, and an example actual pinion angle 406. The representation 400 of FIG. 4 includes a measurement of an example angle 408 corresponding to the requested pinion angle 402, the steering wheel angle 404, and/or the actual pinion angle 406 over time 410. The measurements of the requested pinion angle 402, the steering wheel angle 404, and/or the actual pinion angle 406 can be divided into two step(s), a first step 412 (step 1) and a second step 414 (step 2). While the measurements recorded in the first step 412 mirror the data described in connection with FIG. 1D, the measurements recorded in the second step 414 present a solution to obtain a corrected and/or centered steering wheel position. For example, the steering wheel 102 (e.g., steering wheel angle 404) is initially at approximately two hundred degrees from the center axis 112. The requested pinion angle 402 and the actual pinion angle 406 differ over time due to a time delay between the requested pinion angle 402 and the actual pinion angle 406. For example, while initially the requested pinion angle 402 is at zero degrees (e.g., an example first time interval 420), the actual pinion angle 406 is equivalent to the real-time measurement of the steering wheel angle 404.

Once the steering wheel 102 is released, the EAC actively turns the steering wheel 102 to the target steering position angle (e.g., from example second time interval 424 to example third time interval 426). Subsequently, the EAC holds the steering wheel 102 in position (e.g., at example fourth time interval 428). In the example of FIG. 4, the actual pinion angle 406 rapidly moves towards zero as the EAC returns the steering wheel towards the center axis 112. As the steering wheel angle 404 and the actual pinion angle 406 near zero degrees, the rate of change of the requested pinion angle 402 slows down as the fourth time interval 428 is approached. Similarly, at the fourth time interval 428, the EAC can be disabled once the requested pinion angle 402, the steering wheel angle 404, and/or the actual pinion angle 406 have returned to zero degrees. In the example of FIG. 4, disabling the EAC results in the steering wheel 102 rebounding, as shown at a sixth time interval 430. In the example of FIG. 4, the steering wheel (e.g., including the requested pinion angle 402, the steering wheel angle 404, and/or the actual pinion angle 406) result in a rebound angle 433 (e.g., of approximately +30 degrees) from the center axis 112. The requested pinion angle 402, the steering wheel angle 404, and/or the actual pinion angle 406 continue to remain at the same rebound angle 433 (e.g., at the seventh time interval 432), thereby resulting in a steering wheel 102 position that is off-center.

To correct the steering wheel and return the requested pinion angle 402, the steering wheel angle 404, and/or the actual pinion angle 406 to the center (e.g., zero degrees), a difference can be determined between the center axis 112 and the steering wheel position angle (e.g., based on a comparison of the steering wheel axis 104 of FIG. 1C and the center axis 112). The EAC can be used to ramp the steering angle to the opposite of the calculated difference between the steering wheel position angle and the center axis 112. In the example of FIG. 4, the EAC ramps the steering wheel a total of −30 degrees to account for the rebound angle 433 (e.g., +30 degrees). As such, the requested pinion angle 402 is reduced by the desired amount (e.g., −30 degrees) during the example eighth time interval 434, resulting in the decreased angles of the steering wheel angle 404, and/or the actual pinion angle 406. As such, once the EAC is again disabled, the requested pinion angle 402 rebounds based on the rebound angle 433 (e.g., +30 degrees), as shown during an example ninth time interval 436, followed by the rebounding of the steering wheel angle 404, and/or the actual pinion angle 406 (e.g., as shown in the example tenth time interval 438). As such, the steering wheel 102 is centered (e.g., steering wheel axis 104 matches the center axis 112), and the requested pinion angle 402, the steering wheel angle 404, and/or the actual pinion angle 406 are positioned at an angle of zero degrees relative to the center axis 112. Based on these steps, the steering wheel 102 achieves a stable, centered position (e.g., as shown in the example eleventh time interval 440) as a result of the rebounding of the steering wheel by the determined example difference 443 between the steering wheel position angle and the center axis 112 (e.g., −30 degrees).

Figure 5:
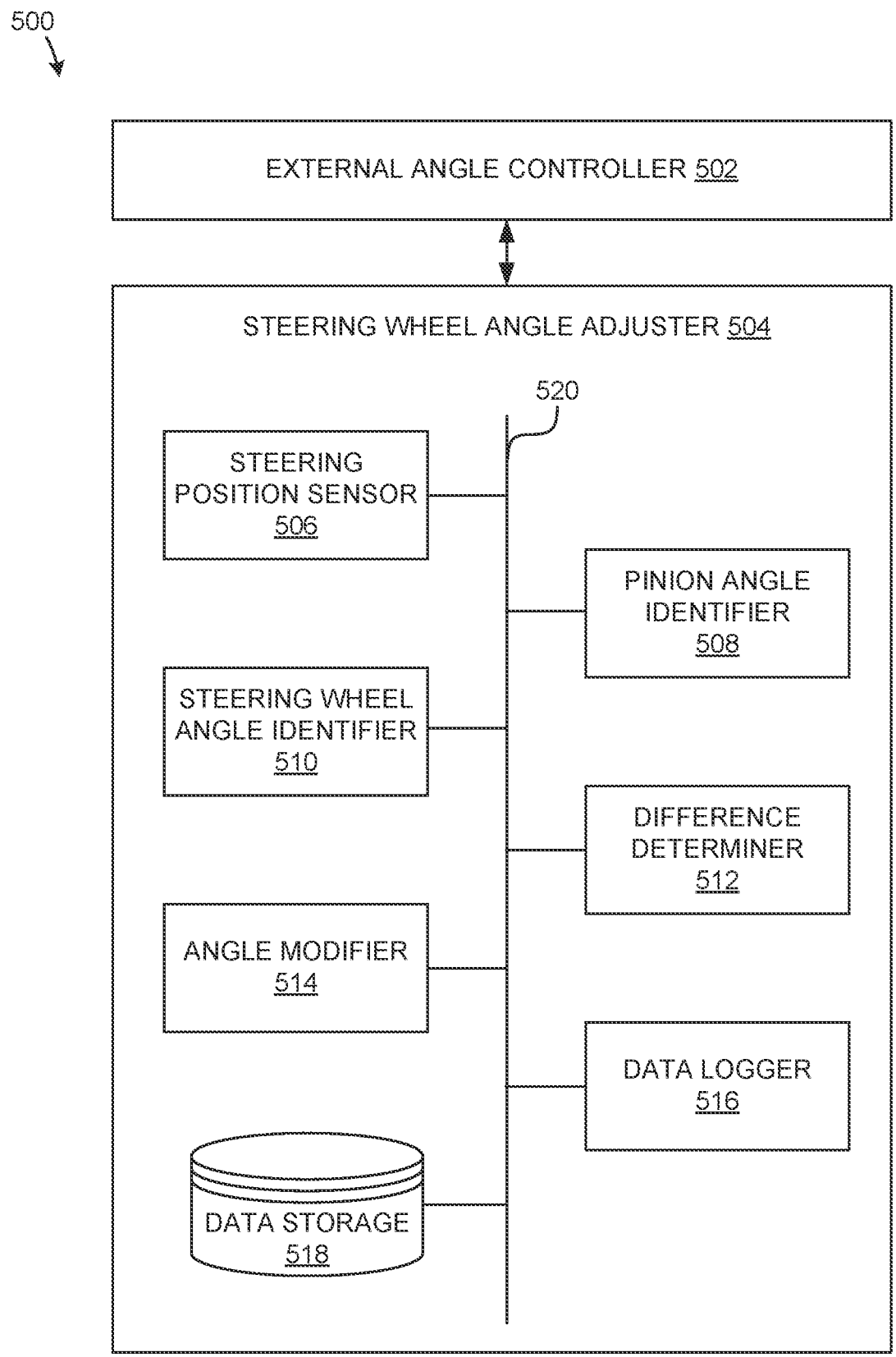
FIG. 5 is a block diagram of an example implementation of a steering wheel angle adjuster in which the examples disclosed herein can be implemented.

FIG. 5 is a block diagram 500 of an example implementation of a steering wheel angle adjuster 504 in which the examples disclosed herein can be implemented. FIG. 5 includes an example external angle controller (EAC) 502. The EAC 502 interacts with the steering wheel angle adjuster 504 to center the steering wheel 102 and/or adjust the position of the road wheels of a vehicle (e.g., see FIGS. 8-12). The steering wheel angle adjuster 504 includes an example steering position sensor 506, an example pinion angle identifier 508, an example steering wheel angle identifier 510, an example difference determiner 512, an example angle modifier 514, an example data logger 516, and an example data storage 518. In the example of FIG. 5, the steering position sensor 506, the pinion angle identifier 508, the steering wheel angle identifier 510, the difference determiner 512, the angle modifier 514, the data logger 516, and the data storage 518 are in communication via an example bus 520.

The external angle controller (EAC) 502 provides control over the angle of the steering wheel 102 and the position of the road wheels of the corresponding vehicle. For example, the EAC 502 can be used to power the steering wheel 102 (e.g., using actuators, etc.) to provide movement of the steering wheel 102 independent of user-based interaction. As described in connection with FIG. 1D and FIG. 5, the EAC 502 can be used to change the steering wheel angle. In some examples, the EAC 502 can be used to rapidly move the steering wheel 102 towards the center (e.g., the center axis 112). In some examples, the EAC 502 ramps the steering angle to an angle opposite of the total difference between the steering wheel angle (e.g., based on the real-time steering wheel axis 104) and an angle defined by the center axis 112. As such, once the electric steering power is disabled (e.g., the EAC 502 is deactivated), the steering wheel 102 can return to the center (e.g., the real-time steering wheel axis 104 overlaps the center axis 112). This allows the EAC 502 to adjust a first steering position angle (e.g., defined by the real-time steering wheel axis 104) to a second steering position angle (e.g., defined by the center axis 112) based on a difference between the first steering position angle and the second steering position angle. Once the second steering position angle corresponds to the centered steering wheel position, the steering wheel can be stowed. In some examples, the EAC 502 interacts with the steering wheel angle adjuster 504 to identify the first steering position angle and the second steering position angle, as well as determine by how much the steering wheel 102 may need to be ramped to center the steering wheel 102 once the electric power steering is turned off.

The steering position sensor 506 identifies a position of the steering wheel 102. In some examples, the steering position sensor 506 is disposed in a steering column of the vehicle. In some examples, the steering position sensor 506 can be used to determine whether the steering wheel 102 is centered. In some examples, input from the steering position sensor 506 can be used by the pinion angle identifier 508 and/or the steering wheel angle identifier 510 to determine a pinion angle (e.g., requested pinion angle 402, actual pinion angle 406) and/or a steering wheel angle (e.g., steering wheel angle 404).

The pinion angle identifier 508 determines the requested pinion angle 402 and/or the actual pinion angle 406 of the steering system. In some examples, the pinion angle identifier 508 compares a first pinion position angle to a second pinion position angle, where the second pinion position angle corresponds to a centered steering wheel position (e.g., as determined using the center axis 112). In some examples, the pinion angle identifier 508 is used to confirm a position of the steering wheel 102 relative to the center axis 112. In some examples, the pinion angle identifier 508 can be used to determine the requested pinion angle 402 of FIG. 4 and/or the actual pinion angle 406 of FIG. 4 to identify whether the requested pinion angle 402 matches the actual pinion angle 406 over time.

The steering wheel angle identifier 510 determines the steering wheel angle 404 of the steering system. In some examples, the steering wheel angle identifier 510 compares a first steering wheel position angle to a second steering wheel position angle, where the second steering wheel position angle corresponds to a centered steering wheel position (e.g., as determined using the center axis 112). In some examples, the steering wheel angle identifier 510 is used to confirm a position of the steering wheel 102 relative to the center axis 112.

The difference determiner 512 identifies a difference associated with an angle of the steering wheel 102. For example, the difference determiner 512 can be used to determine the steering position angle difference 200 (e.g., at zone 1 of FIG. 1B) and/or the steering position angle difference 250 (e.g., at zone 2 of FIG. 1C). For example, the difference determiner 512 can determine how far from the center axis 112 the steering wheel axis 104 is located. In the example of FIG. 1B, the difference determiner 512 identifies how far from the center axis 112 the steering wheel 102 is positioned once the EAC 502 turns the steering wheel to a target steering position angle (e.g., zone 1 difference). In the example of FIG. 1C, the difference determiner 512 identifies how far from the center axis 112 the steering wheel 102 is positioned once steering assist is removed and the steering wheel 102 rebounds (e.g., zone 2 difference).

The angle modifier 514 adjusts the steering wheel position angle (e.g., a first steering position angle) to match the second steering position angle (e.g., a position angle that corresponds to a centered steering wheel position). For example, once the difference determiner 512 determines a rebound angle (e.g., rebound angle 433) based on the offset of the steering wheel 102 position from the center axis 112, the angle modifier 514 can be used to adjust the steering wheel position (e.g., using the EAC 502) to match the center axis 112.

The data logger 516 logs any data associated with input from the steering position sensor 506, the pinion angle identifier 508, the steering wheel angle identifier 510, the difference determiner 512, and/or the angle modifier 514. In some examples, the data logger 516 records the requested pinion angle 402, the steering wheel angle 404, and/or the actual pinion angle 406. In some examples, the data logger 516 records changes in angle readings over time (e.g., time 410) to identify changes in steering wheel positioning with respect to the center axis 112. In some examples, the data logger 516 records changes in the rebound angle (e.g., rebound angle 433) based on a displacement of the steering wheel 102 from the center axis 112.

The data storage 518 can be used to store any information associated with the EAC 502, the steering position sensor 506, the pinion angle identifier 508, the steering wheel angle identifier 510, the difference determiner 512, and/or the angle modifier 514. In some examples, the data storage 518 stores generated graphs, identified differences, and/or applied steering wheel angle corrections. The example data storage 518 of the illustrated example of FIG. 5 can be implemented by any memory, storage device and/or storage disc to store data such as flash memory, magnetic media, optical media, storage in the cloud, etc. Furthermore, the data stored in the example data storage 518 can be in any data format such as binary data, comma-delimited data, tab-delimited data, structured query language (SQL) structures, image data, etc.

While an example manner of implementing the steering wheel angle adjuster 504 is illustrated in FIG. 5, one or more of the elements, processes and/or devices illustrated in FIG. 5 may be combined, divided, re-arranged, omitted, eliminated and/or implemented in any other way. Further, the example steering position sensor 506, the example pinion angle identifier 508, the example steering wheel angle identifier 510, the example difference determiner 512, the example angle modifier 514, the example data logger 516, and/or more generally the steering wheel angle adjuster 504, may be implemented by hardware, software, firmware and/or any combination of hardware, software and/or firmware. Thus, for example, any of the example steering position sensor 506, the example pinion angle identifier 508, the example steering wheel angle identifier 510, the example difference determiner 512, the example angle modifier 514, the example data logger 516, and/or more generally the steering wheel angle adjuster 504 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable logic device(s) (FPLD(s)), and/or field-programmable gate array (FPGA)). When reading any of the apparatus or system claims of this patent to cover a purely software and/or firmware implementation, at least one of the example steering position sensor 506, the example pinion angle identifier 508, the example steering wheel angle identifier 510, the example difference determiner 512, the example angle modifier 514, the example data logger 516, and/or more generally the steering wheel angle adjuster 504 is/are hereby expressly defined to include a non-transitory computer readable storage device or storage disk such as a memory, a digital versatile disk (DVD), a compact disk (CD), a Blu-ray disk, etc. including the software and/or firmware. Further still, the example steering wheel angle adjuster 504 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
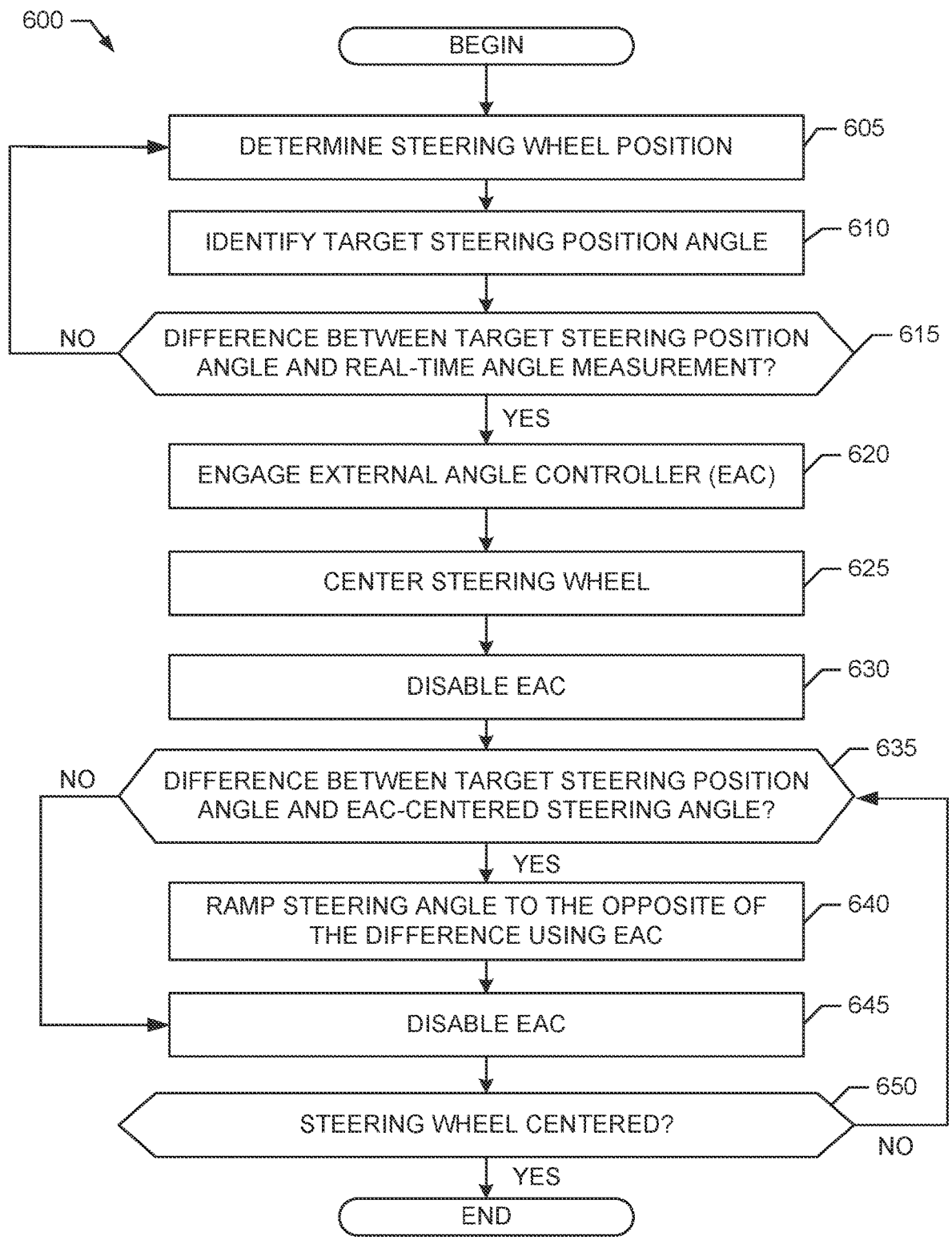
FIG. 6 illustrates a flowchart representative of example machine readable instructions which may be executed to implement the example steering wheel angle adjuster of FIG. 5.

A flowchart representative of example hardware logic, machine readable instructions, hardware implemented state machines, and/or any combination thereof for implementing the steering wheel angle adjuster 504 is shown in FIG. 6. The machine readable instructions may be one or more executable programs or portion(s) of an executable program for execution by a computer processor and/or processor circuitry, such as the processor circuitry 712 shown in the example processor platform 700 discussed below in connection with FIG. 7. The program(s) may be embodied in software stored on a non-transitory computer readable storage medium such as a CD-ROM, a floppy disk, a hard drive, a DVD, a Blu-ray disk, or a memory associated with the processor circuitry 712, but the entirety of the program(s) and/or parts thereof could alternatively be executed by a device other than the processor circuitry 712 and/or embodied in firmware or dedicated hardware. Further, although the example program(s) is/are described with reference to the flowchart illustrated in FIG. 6, many other methods of implementing the example steering wheel angle adjuster 504 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 6 illustrates a flowchart representative of example machine readable instructions 600 which may be executed to implement the example steering wheel angle adjuster 504 of FIG. 5. In the example of FIG. 6, the steering position sensor 506 determines the steering wheel position (block 605). For example, the steering position sensor 506 determines the location of the steering wheel 102 relative to the center axis 112 of FIGS. 1A, 1B, 1C. Based on input from the steering position sensor 506, the pinion angle identifier 508 and/or the steering wheel angle identifier 510 can determine the real-time pinion angle and/or the steering wheel angle 404. In some examples, the pinion angle identifier 508 and/or the steering wheel angle identifier 510 can be used to identify a target steering position angle (block 610). The steering wheel angle adjuster 504 (e.g., the pinion angle identifier 508 and/or the steering wheel angle identifier 510) compares a first steering position angle to a second steering position angle, where the second steering position angle corresponds to a centered steering wheel position. If the steering wheel angle adjuster 504 determines that a difference exists between the target steering position angle (e.g., as determined using the center axis 112) and a real-time steering position angle measurement (block 615), the steering wheel angle adjuster 504 engages the external angle controller (EAC) 502 (block 620). In the absence of a difference between the target steering position angle (e.g., as determined using the center axis 112) and the real-time angle measurement, the steering wheel angle adjuster 504 continues to receive and process input from the steering position sensor 506 until a difference is identified.

Once the EAC 502 is engaged (block 620), the EAC 502 centers the steering wheel 102 by moving the steering wheel 102 towards the target steering position angle (e.g., as defined by the center axis 112) (block 625). Once the EAC 502 has re-positioned the steering wheel 102 relative to the center axis 112, the EAC 502 is disabled (block 630), allowing the difference determiner 512 to identify a difference between the target steering position angle (e.g., defined by the center axis 112) and the EAC-centered steering angle (block 635). If the difference determiner 512 identifies a difference in the two angle measurements, the angle modifier 514 adjusts the off-center steering position angle to match the target steering position angle (e.g., the target steering position angle corresponding to the centered steering wheel position). For example, the angle modifier 514 can engage the EAC 502 to ramp the steering angle to the opposite of the determined difference in the angle measurements (block 640). For example, if the steering wheel 102 is determined to be displaced a total of +30 degrees from the center axis 112, the angle modifier 514 engages the EAC 502 to ramp the steering wheel to −30 degrees from the center axis 112. As such, when the EAC 502 is disabled (block 645), the steering wheel rebounds such that the steering wheel position angle (e.g., as defined using axis 104 of FIGS. 1A, 1B, 1C) matches the target steering position angle (e.g., as defined using the center axis 112). If the difference determiner 512 does not identify a difference between the target steering position angle and the EAC-centered steering angle, the EAC 502 is disabled (block 645). Subsequently, the steering wheel angle adjuster 504 can verify whether the steering wheel is centered based on input from the steering position sensor 506, as well as the pinion angle identifier 508 and/or the steering wheel angle identifier 510. Once the steering wheel is centered (block 650), the steering wheel can be stowed. However, if steering wheel angle adjuster 504 determines that the steering wheel 102 is not yet fully centered (e.g., the steering wheel axis 104 does not overlie the center axis 112), control is returned to the difference determiner 512 to identify the difference between the target steering position angle (e.g., defined by the center axis 112) and the EAC-centered steering angle in order to determine by how much the EAC should adjust the steering wheel 102 position angle to match the target steering position angle.

Figure 7:
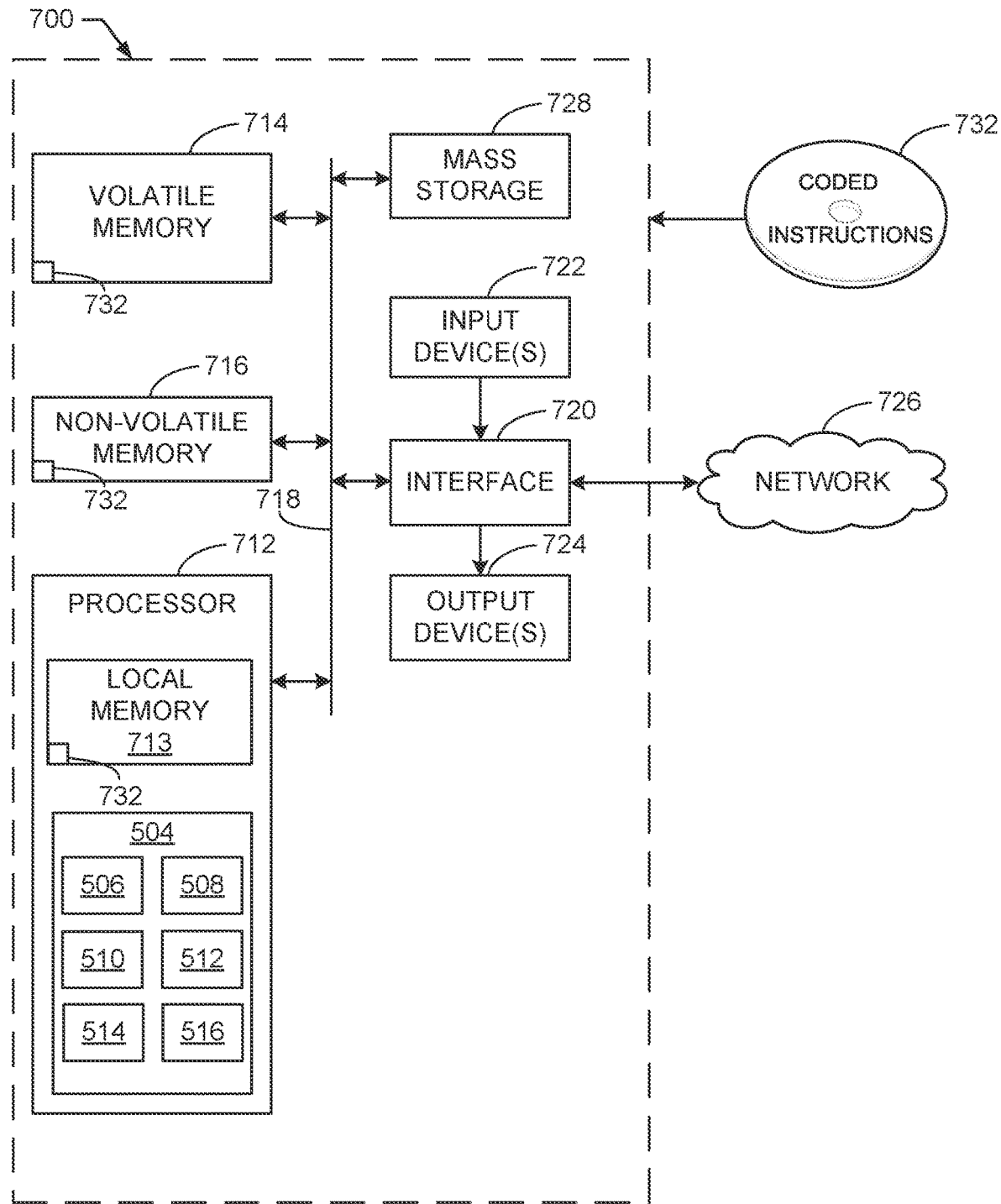
FIG. 7 is a block diagram of an example processing platform structured to execute the instructions of FIG. 6 to implement the example steering wheel angle adjuster of FIG. 5.

FIG. 7 is a block diagram of an example processor platform 700 structured to execute the instructions of FIG. 6 to implement the example steering wheel angle adjuster 504 of FIG. 5. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor circuitry 712 may be a semiconductor based (e.g., silicon based) device. In this example, the processor circuitry 712 implements the example steering position sensor 506, the example pinion angle identifier 508, the example steering wheel angle identifier 510, the example difference determiner 512, the example angle modifier 514, and/or the example data logger 516.

The processor 712 of the illustrated example includes a local memory 713 (e.g., a cache). The processor 712 of the illustrated example is in communication with a main memory including a volatile memory 714 and a non-volatile memory 716 via a link 718. The link 718 may be implemented by a bus, one or more point-to-point connections, etc., or a combination thereof. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

Machine executable instructions 732 represented in FIG. 6 may be stored in the mass storage device 728, in the volatile memory 714, in the non-volatile memory 716, in the local memory 713 and/or on a removable non-transitory computer readable storage medium, such as a CD or DVD.

Figure 8:
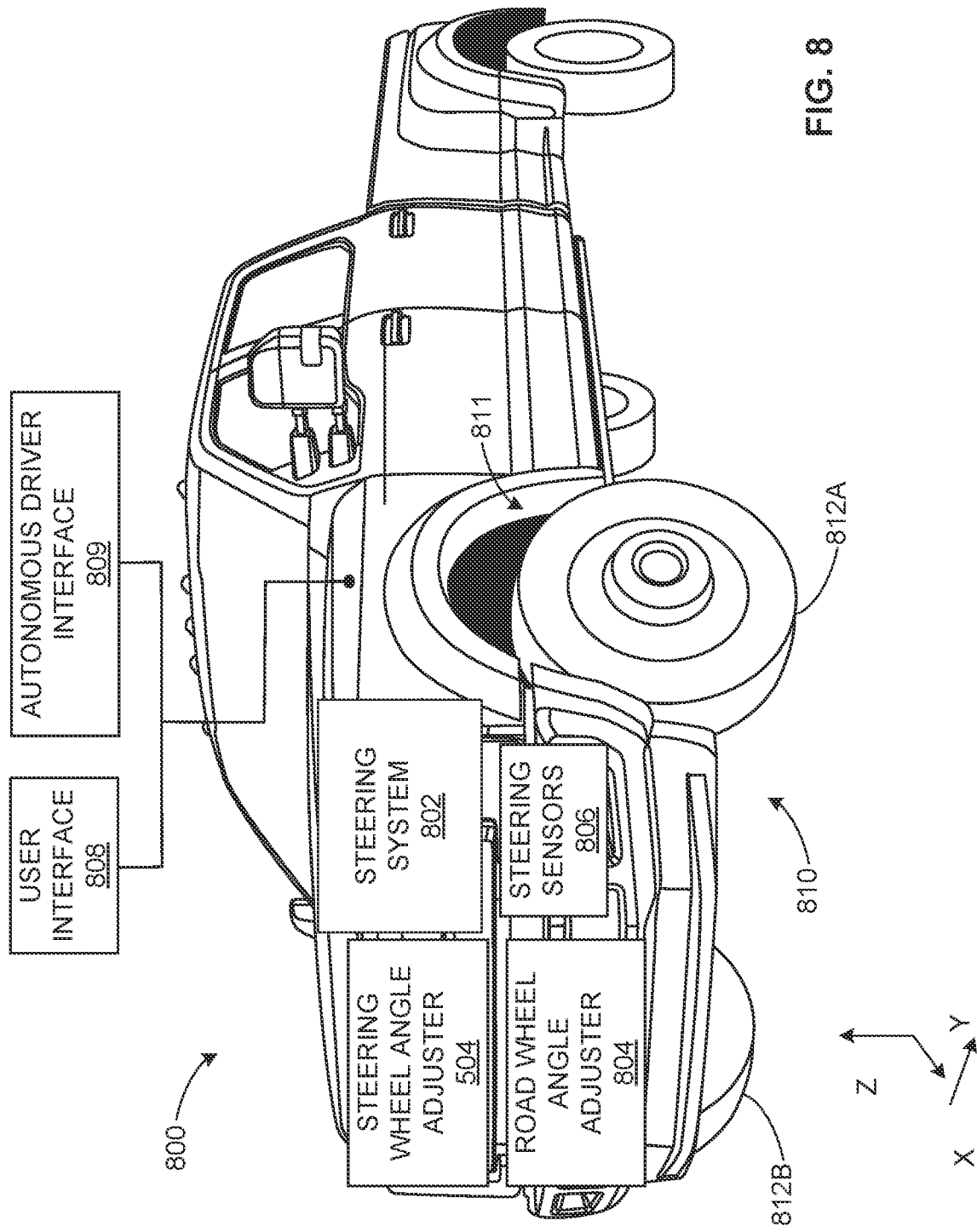
FIG. 8 illustrates an example vehicle in which the teachings of this disclosure can be implemented.

FIG. 8 illustrates an example vehicle 800 in which the teachings of this disclosure can be implemented. In the illustrated example of FIG. 8, the vehicle 800 includes an example steering system 802, an example road wheel angle adjuster 804, example steering sensors 806, an example user interface 808, an example autonomous driving interface 809, an example axle 810, and an example suspension system 811. In the illustrated example of FIG. 8. The axle 810 includes an example first road wheel 812A and an example second road wheel 812B. In the illustrated example of FIG. 8, the vehicle 800 includes the steering wheel angle adjuster 504 of FIG. 5.

The vehicle 800 is a motorized wheel-driven vehicle. In the illustrated example of FIG. 8, the vehicle 800 is a pick-up truck. In other examples, the vehicle 800 can be any type of wheeled vehicle (e.g., a sedan, a coupe, a van, a sports utility vehicle, an all-terrain vehicle (ATV), farming equipment, etc.). In some examples, the vehicle 800 includes an internal combustion engine (e.g., a non-electrified vehicle, a partially electrified vehicle, etc.). In other examples, the vehicle 800 is a fully electric vehicle. In some examples, the vehicle 800 can be a fully autonomous vehicle and/or a partially autonomous vehicle.

The steering system 802 allows a user of the vehicle 800 to control/steer the vehicle 800. In the illustrated example of FIG. 8, the steering system 802 includes a mechanical linkage between a user interface of the vehicle 800 (e.g., the steering wheel 102 of FIGS. 1A-1C, etc.) and the wheels of the vehicle 800 (e.g., via a steering column and rack and pinion system, etc.). In other examples, the steering system 802 can be a steer-by-wire system and/or a partially steer-by-wire system. In the illustrated example of FIG. 8, the steering system 802 includes an electric power steering system (e.g., the electric power steering system associated with the steering wheel angle adjuster 504 of FIG. 5, etc.). In other examples, the steering system 802 can include any suitable type of power steering and/or steering assist (e.g., hydraulic, hybrid electro-hydraulic systems, etc.). In some examples, the steering system 802 includes the EAC 502 of FIG. 5.

The road wheel angle adjuster 804 adjusts the rotational position of the road wheels 812A, 812B about the vertical axis. For example, the road wheel angle adjuster 804 can receive a desired position of the road wheels 812A, 812B from a user interface 808 and/or the autonomous driving interface 809 to move the rotational position of the road wheels 812A, 812B about the vertical axis to a target position (e.g., a straightly-forward position, etc.). An example implementation of the road wheel angle adjuster 804 is described below in conjunction with FIG. 10. In some examples, some or all of the road wheel angle adjuster 804 can be implemented by an electronic control unit (ECU) of the vehicle 800. In other examples, the road wheel angle adjuster 804 can be implemented by another suitable computer (e.g., another computer of the vehicle 800, a mobile device of a user of the vehicle 800, a remote computer, etc.). In some examples, the road wheel angle adjuster 804 can be implemented by the same processing system as the steering wheel angle adjuster 504. In other examples, the road wheel angle adjuster 804 and the steering wheel angle adjuster 504 can be implemented by separate systems.

The steering sensors 806 include one or more sensors that measure different metrics related to the steering system 802. For example, the steering sensors 806 can measure the position of a steering wheel, a speed of the steering wheel, a position of the steering system (e.g., a position of the steering rack and pinion, etc.), system parameters related to the power steering system, etc. In some examples, the steering sensors 806 can include the steering position sensor 506 of FIG. 5. In some examples, the steering sensors 806 can measure parameters that include the rotational position of the road wheels 812A, 812B, the speed of the rotation of the road wheels 812A, 812B about the vertical axis, etc.

The user interface 808 enables a user of the vehicle 800 to receive and input information from/to the steering wheel angle adjuster 504, the road wheel angle adjuster 804, and/or other systems of the vehicle 800. For example, the user interface 808 can be implemented by a display of the vehicle 800. In some examples, the user interface 808 permits a user of the vehicle to submit a request to the vehicle 800 (e.g., a parking request, a request to cycle the wheels, etc.) Additionally or alternatively, the user interface 808 can include one or more dash indicator(s), one or more button(s) on the dashboard or steering wheel, one or more speakers, one or more microphones, etc. In some examples, the user interface 808 can be implemented by a mobile device of the user (e.g., a mobile phone, a smartwatch, a tablet, etc.).

The autonomous driving interface 809 interfaces an autonomous driving system of the vehicle 800 with other systems of the vehicle 800. For example, the vehicle 800 can include a system that enables the vehicle 800 to drive without and/or with reduced input from an operator of the vehicle 800 (e.g., a fully self-driving system, a partially self-driving system, etc.). In such examples, the autonomous driving interface 809 enables the autonomous driving system to receive data from the steering sensors 806 and/or the user interface 808 and to send commands to the steering wheel angle adjuster 504, the steering system 802, the road wheel angle adjuster 804, etc. In some examples, the autonomous driving interface 809 and/or the autonomous driving system can be absent.

The example suspension system 811 can include an independent suspension (e.g., a wishbone suspension, etc.), a solid axle suspension (e.g., a leaf spring suspension, etc.), or a combination thereof (e.g., a front axle independent suspension, a rear axle dependent suspension, etc.). In some examples, the suspension system 811 can exert residual forces on the steering system 802 that cause the rebound of the steering system.

The example axle 810 includes the first road wheel 812A and the second road wheel 812B. During the operation of the vehicle 800 and/or steering system 802, the tires of the road wheels 812A, 812B elastically deform due to the weight of the vehicle 800 and the force associated with the steering system 802. In some examples, the tires of the road wheels 812A, 812B can impart forces on the steering system 802 due to the elastic force (e.g., the spring back force, etc.) exerted by the deformation of the tires of the road wheels 812A, 812B and/or the friction of the tires of the road wheels 812A, 812B against the driving surface. In some examples, the residual forces of the steering system 802, the suspension system 811, and/or the tires of the road wheels 812A, 812B can cause the steering system 802, the axle 810, and the road wheels 812A, 812B to move after the steering assist is disengaged (e.g., as depicted in the fourth graph region 162 of FIG. 1D and the wheel repositioning 118 of FIG. 1C, etc.). An example recoil rotation of the road wheels 812A, 812B is described below in conjunction with FIG. 9D FIGS. 9A-9E illustrate various positions of the road wheels 812A, 812B of the axle 810 of FIG. 8 during the adjustment of the road wheels 812A, 812B to a desired position. In the illustrated examples of FIGS. 9A-9E, the positions and movements of the first road wheel 812A are described. However, it should be appreciated that the second road wheel 812B undergoes similar movements as the first road wheel 812A during the process illustrated in FIGS. 9A-9E.

Figure 9A:
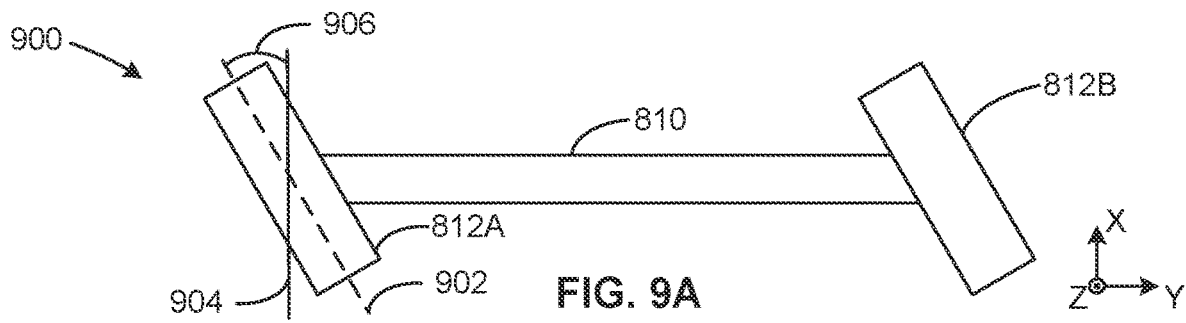
FIGS. 9A-9E illustrate various positions of the road wheels of the vehicle of FIG. 8 during the adjustment of the wheels to a desired position via a first technique.

FIG. 9A illustrates the road wheels 812A, 812B in an example first position 900 has been moved via the steering system 802. In some examples, the first position 900 corresponds to a position of the road wheels 812A, 812B after the vehicle 100 has been parked (e.g., in a parking space, between other vehicles via parallel parking, etc.).

In the illustrated example of FIG. 9A, the road wheel 812A is an example first rotational position 902. In the illustrated example of FIG. 9A, a command has been issued (e.g., via the user interface 808, via the autonomous driving interface 809, etc.) to move the road wheel 812A into an example target position 904, which has an example angular displacement 906 relative to the first rotational position 902. For example, the command to move to the target position 904 can be generated in response to a parking event (e.g., after the vehicle 800 is parked, etc.), after fully cycling the wheels in response to a cycle request, and/or any other suitable triggering event. In other examples, the target position 904 can be input by a user of the vehicle 800 via the user interface 808 and/or via an autonomous driving system associated with the autonomous driving interface 809.

In the illustrated example of FIGS. 9A-9E, the target position 904 corresponds to a straightly forward position of the road wheels 812A, 812B. In other examples, the target position 904 can be any other suitable position (e.g., an initial position of the first road wheel 812A prior to fully cycling the position of the first road wheel 812A, etc.).

Figure 9B:
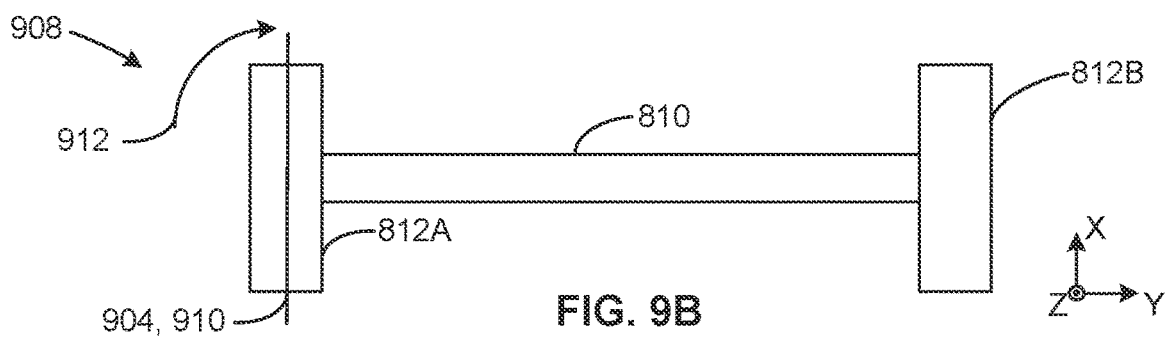

FIG. 9B illustrates the road wheels 812A, 812B in an example second position 908. In the illustrated example of FIG. 9B, the first road wheel 812A is an example second rotational position 910, which is the target position 904. In the illustrated example of FIG. 9B, the first road wheel 812A has been moved from the first rotational position 902 to the second rotational position 910 via an example first driven rotation 912. In some examples, the first driven rotation 912 is conducted via the external angle controller (EAC) of FIGS. 5 and 10. In some examples, the first driven rotation 912 is conducted at a singular speed through the length of the first driven rotation 912. In other examples, the speed of the first driven rotation 912 can decrease as the second rotational position 910 is neared. In some examples, after reaching the second rotational position 910 (e.g., the target position 904, etc.), the EAC 502 is disengaged.

Figure 9C:
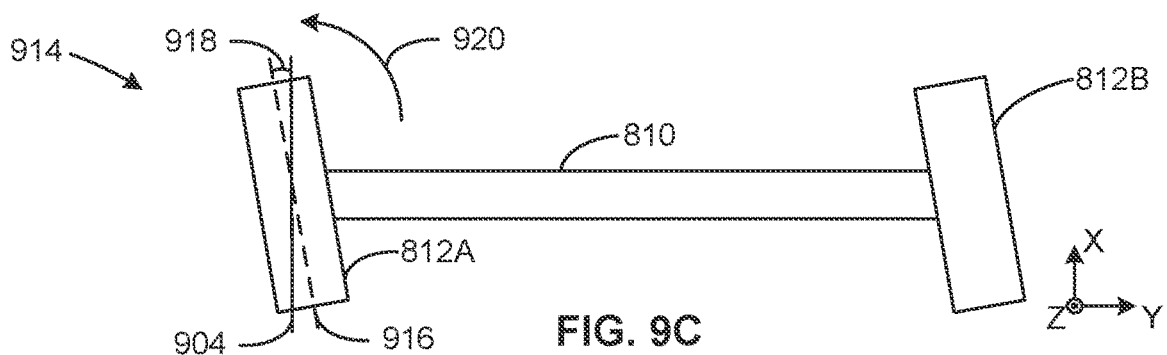

FIG. 9C illustrates the road wheels 812A, 812B in an example third position 914. In the illustrated example of FIG. 9C, the first road wheel 812A is an example third rotational position 916, which is displaced from the target position 904 by an example second angular displacement 918. After the EAC 502 is disengaged following the first driven rotation 912 of FIG. 9B, the wheel 812A has undergone an example first recoil rotation 920 to the third rotational position 916. In some examples, the first recoil rotation 920 can be caused by residual forces from elastic deformation of the tires of the road wheels 812A, 812B, frictional forces between the tires of the road wheels 812A, 812B, strain in the components of the suspension system 811, and/or strain in the components of the steering system 802. In some examples, the road wheel angle adjuster 804 can determine the magnitude of the first recoil rotation 920 via the steering sensors 806. In other examples, the road wheel angle adjuster 804 can estimate the magnitude of the first recoil rotation 920 by estimating the deformation of the tires of the road wheels 812A, 812B based on a contact patch of the driving surface.

Figure 9D:
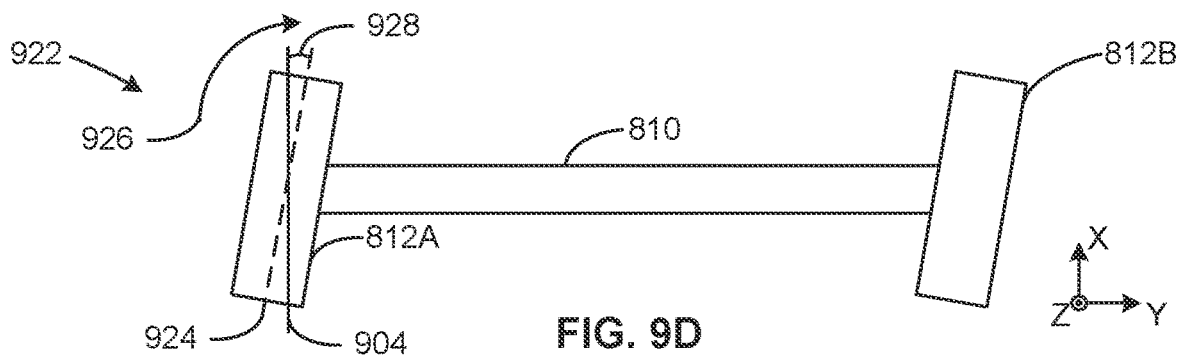

FIG. 9D illustrates the road wheels 812A, 812B in an example fourth position 922. In the illustrated example of FIG. 9D, the first road wheel 812A is in an example fourth rotational position 924. In the illustrated example of FIG. 9D, the first road wheel 812A has been moved from the third rotational position 916 to the fourth rotational position 924 via an example second driven rotation 926. In the illustrated example of FIG. 9D, the fourth rotational position 924 is displaced from the target position 904 by an example third angular displacement 928.

The fourth rotational position 924 (e.g., an overshoot position, etc.) and the third angular displacement 928 (e.g., an overshoot angle, etc.) are determined via the magnitude of the first recoil rotation 920 of FIG. 9B and the resulting second angular displacement 918. In some examples, the third angular displacement 928 is determined by the road wheel angle adjuster 804 to compensate for the recoil rotation that will occur after the disengagement of the EAC of FIGS. 5 and 10. In the illustrated example of FIG. 9D, the third angular displacement 928 is equal and opposite to the magnitude to the second angular displacement 918 relative to the target position 904. In other examples, the magnitude of the third angular displacement 928 can be calculated by another other suitable means. In some examples, the first driven rotation 912 is conducted via the external angle controller (EAC) of FIGS. 5 and 10. In some examples, the first driven rotation 912 is conducted at a singular speed through the length of the first driven rotation 912. In other examples, the speed of the first driven rotation 912 can decrease as the second rotational position 910 is neared. In some examples, after reaching the second rotational position 910 (e.g., the target position 904, etc.), the EAC 502 is disengaged.

Figure 9E:
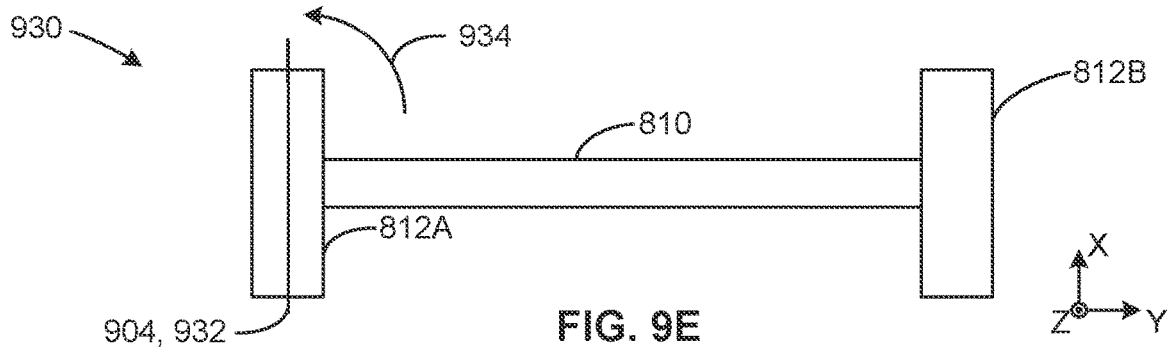

FIG. 9E illustrates the road wheels 812A, 812B in an example fifth position 930. In the illustrated example of FIG. 9D, the first road wheel 812A is an example fifth rotational position 932, which is the target position 904. After the EAC is disengaged following the second driven rotation 926 of FIG. 9D, the first road wheel 812A has undergone an example second recoil rotation 934 to the fifth rotational position 932. Because the fourth rotational position 924 was determined to compensate for the second recoil rotation 934, the second recoil rotation 934 causes the second road wheel 812B to rotate to the target position 904/the fifth rotational position 932. In some examples, the fifth rotation position 932 may not be the same as the target position 904. In some such examples, the process illustrated in FIGS. 9A-9E can be repeated using the fifth rotational position 932 as the first rotational position 902 of FIG. 9A.

Figure 10:
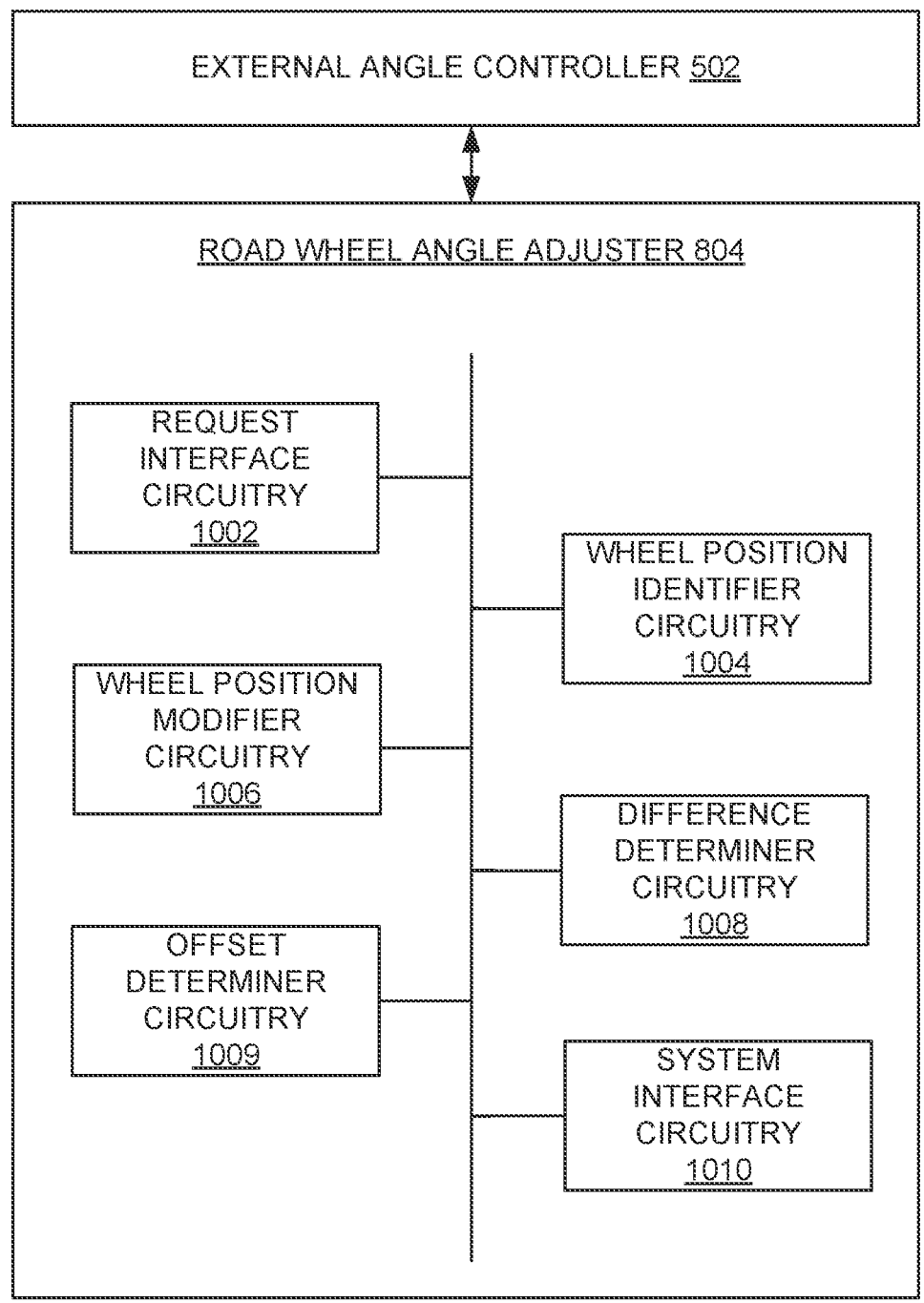
FIG. 10 is a block diagram of an example implementation of the road wheel angle adjuster of FIG. 8.

FIG. 10 is a block diagram of an example implementation of the road wheel angle adjuster 804 of FIG. 8. In the illustrated example of FIG. 10, the road wheel angle adjuster 804 includes example request interface circuitry 1002, example wheel position identifier circuitry 1004, example wheel position modifier circuitry 1006, example difference determiner circuitry 1008, and example system interface circuitry 1010. In some examples, some or all of the function(s) of the road wheel angle adjuster 804 can be implemented by the components of the steering wheel angle adjuster 504.

The request interface circuitry 1002 can be used to identify a target wheel position. For example, the request interface circuitry 1002 can receive a target wheel position from a user (e.g., via a user interface 808 of FIG. 8, etc.). Additionally or alternatively, the request interface circuitry 1002 can receive a target wheel position from an autonomous driving system of the vehicle 800 (e.g., via the autonomous driving interface 809 of FIG. 8, etc.). In other examples, the request interface circuitry 1002 can receive a target wheel position via any other suitable means. The request interface circuitry 1002 can also detect a request to cycle the position of road wheels. For example, the request interface circuitry 1002 can receive a request to cycle (e.g., a cycle request, etc.) the position of the road wheels (e.g., move from a first maximum travel to a second maximum travel, etc.) from the user interface 808 and/or autonomous driving interface 809. In some examples, the request interface circuitry 1002 can receive cycle requests to periodically (e.g., monthly, yearly, etc.) and/or milestone-based (e.g., every 5,000 miles, every 10,000 miles, etc.) verify the system health of the steering system 802 and/or the road wheels 812A, 812B.

The wheel position identifier circuitry 1004 identifies a position of one or more the road wheels 812A, 812B. In some examples, the wheel position identifier circuitry 1004 can interface with sensors disposed on the steering system 802 (e.g., the steering column, the pinion, etc.) and/or the road wheels 812A, 812B. In some examples, the wheel position identifier circuitry 1004 can be used to determine whether the road wheels 812A, 812B are in the straightly forward position. In some examples, the wheel position identifier circuitry 1004 is used to confirm a position of the road wheels 812A, 812B relative to the straightly forward position (e.g., the target position 904 of FIGS. 9A-9E, etc.). In some examples, the wheel position identifier circuitry 1004 can be implemented by the steering position sensor 506 of FIG. 5.

The wheel position modifier circuitry 1006 adjusts the position of the road wheels (e.g., road wheel angle, etc.) to a target position received by the request interface circuitry 1002. For example, the wheel position modifier circuitry 1006 can modify the position of the road wheels 812A, 812B by interfacing with the EAC 502 via the system interface circuitry 1010. In other examples, the wheel position modifier circuitry 1006 can adjust the position of the road wheels by any other suitable means. In some examples, the wheel position modifier circuitry 1006 can be implemented by the angle modifier 514 of FIG. 5.

The difference determiner circuitry 1008 identifies an angular difference associated a current angle of the road wheels 812A, 812B and the target wheel position. For example, the difference determiner circuitry 1008 can be used to determine the difference (e.g., the angular displacement 906 of FIG. 9A, etc.) of a current road wheel position (e.g., the first rotational position 902 of FIG. 9A, etc.) and a target position (e.g., the target position 904 of FIGS. 9A-9E, etc.). In some examples, the difference determiner circuitry 1008 can be used to determine an overshoot angle (e.g., the third angular displacement 928 of FIG. 9D, etc.) to adjust the road wheels 812A, 812B such that the recoil rotation (e.g., the second recoil rotation 934, etc.) would cause the road wheels 812A, 812B to return the target position.

The offset determiner circuitry 1009 determines (e.g., calculates, estimates, etc.) the angular offset (e.g., the angular offset 1314 of FIG. 13, etc.) based on an expected recoil rotation caused by the disengagement of the EAC 502. In such examples, the offset determiner circuitry 1009 determines the angular offset such that the recoil rotation caused by the disengagement of the EAC 502 causes the road wheels 812A, 812B to rotate to the target position. In some examples, the offset determiner circuitry 1009 can be absent, disengaged and/or otherwise deactivated. In such examples, the road wheel angle adjuster 804 can move the road wheels to a requested position via one or more processes described in conjunction with FIGS. 9A-9E and FIG. 12. In examples including the offset determiner circuitry 1009, the road wheel angle adjuster 804 can move the road wheels to a requested position via one or more processes described in conjunction with FIGS. 13A-13E and FIG. 16.

The offset determiner circuitry 1009 determines the offset angle based on a relationship between parameters of the sensor data collected during the initial actuation of the steering wheel 200 via the steering assist interface circuitry 1010. The offset determiner circuitry 1009 can, during the initial articulation of the steering wheel 200 and based on sensor data collected from the steering sensors 806, determine the rotational displacement (e.g., an angular segment, etc.) over which the mathematical relationship between a first parameter associated with a position of the steering system 802 (e.g., steering wheel angle, a position of a pinion on a rack, a tie rod position, etc.) and a second parameter associated with a load on a steering system 802 (e.g., a load on a tie rod, a load on a rack, etc.) changes from a first linear relationship to a second relationship (e.g., a second linear relationship, a non-linear relationship, etc.). As used herein, a "linear relationship" refers to a relationship between parameters that are approximately linear. The relationship between parameters with a linear relationship can include noise and/or other minor variations. In some examples, the offset determiner circuitry 1009 can access the first parameter and/or the second parameter from the sensor data associated with the steering sensors 806. Additionally or alternatively, the offset determiner circuitry 1009 can determine the first parameter and/or the second parameter based on the sensor data received from the steering sensors 806 (e.g., derive the parameters from the sensor data, etc.).

The system interface circuitry 1010 interfaces other systems of the vehicle 800. For examples, the system interface circuitry 1010 can cause the EAC 502 to engage and/or disengage from the steering system 802. In some examples, the system interface circuitry 1010 can interface with the autonomous driving system of the vehicle 800 and/or the user interface 808.

While an example manner of implementing the road wheel angle adjuster 804 of FIG. 8 is illustrated in FIG. 10, one or more of the elements, processes, and/or devices illustrated in FIG. 10 may be combined, divided, re-arranged, omitted, eliminated, and/or implemented in any other way. Further, the example request interface circuitry 1002, wheel position identifier circuitry 1004, the wheel position modifier circuitry 1006, the difference determiner circuitry 1008, the system interface circuitry 1010, and/or, more generally, the example road wheel angle adjust 804 of FIGS. 8 and 10, may be implemented by hardware alone or by hardware in combination with software and/or firmware. Thus, for example, any of the example request interface circuitry 1002, wheel position identifier circuitry 1004, the wheel position modifier circuitry 1006, the difference determiner circuitry 1008, the system interface circuitry 1010, and/or, more generally, the example road wheel angle adjuster 804, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example road wheel angle adjust 804 of FIG. 1 may include one or more elements, processes, and/or devices in addition to, or instead of, those illustrated in FIGS. 8 and 10, and/or may include more than one of any or all of the illustrated elements, processes and devices.

Figure 11:
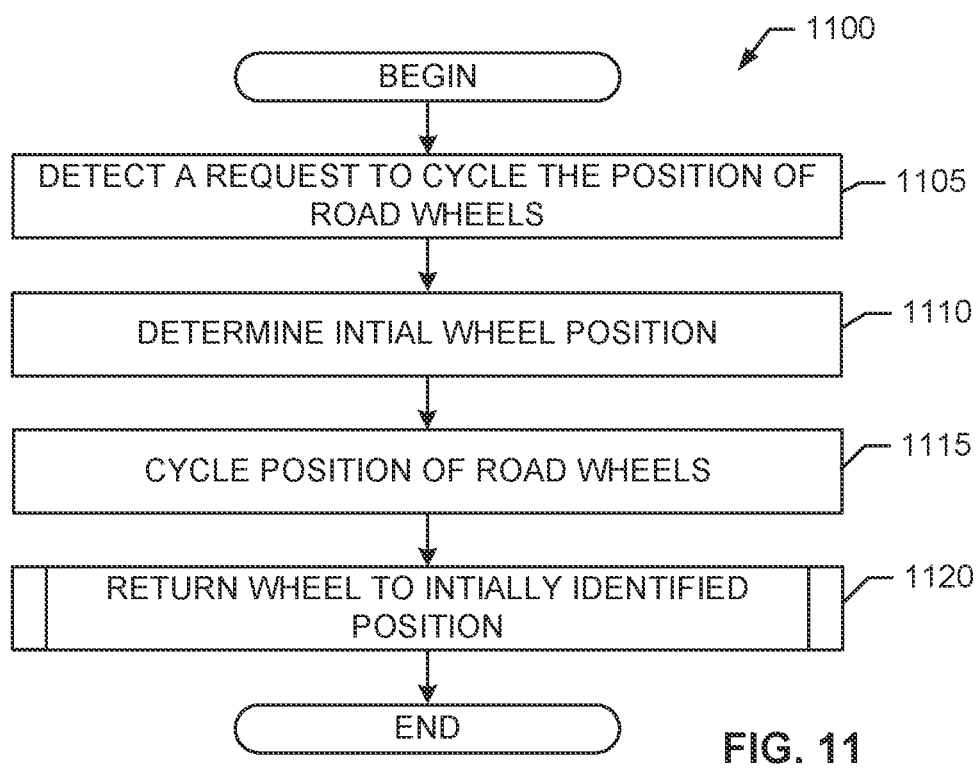
FIGS. 11-12 illustrate flowcharts representative of example machine readable instructions which may be executed to implement the example road wheel angle adjuster of FIG. 10.
Figure 12:
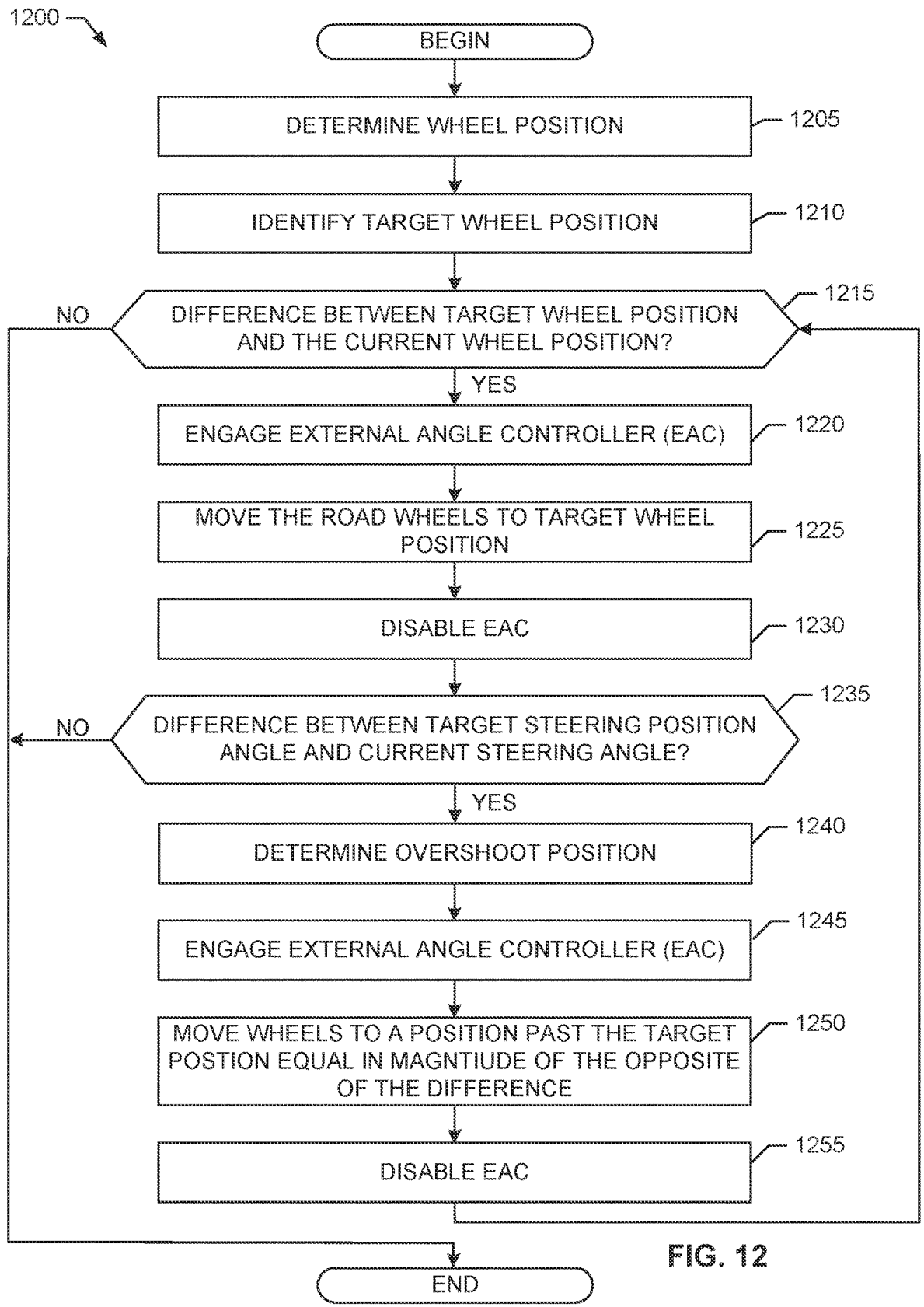
Figure 16:
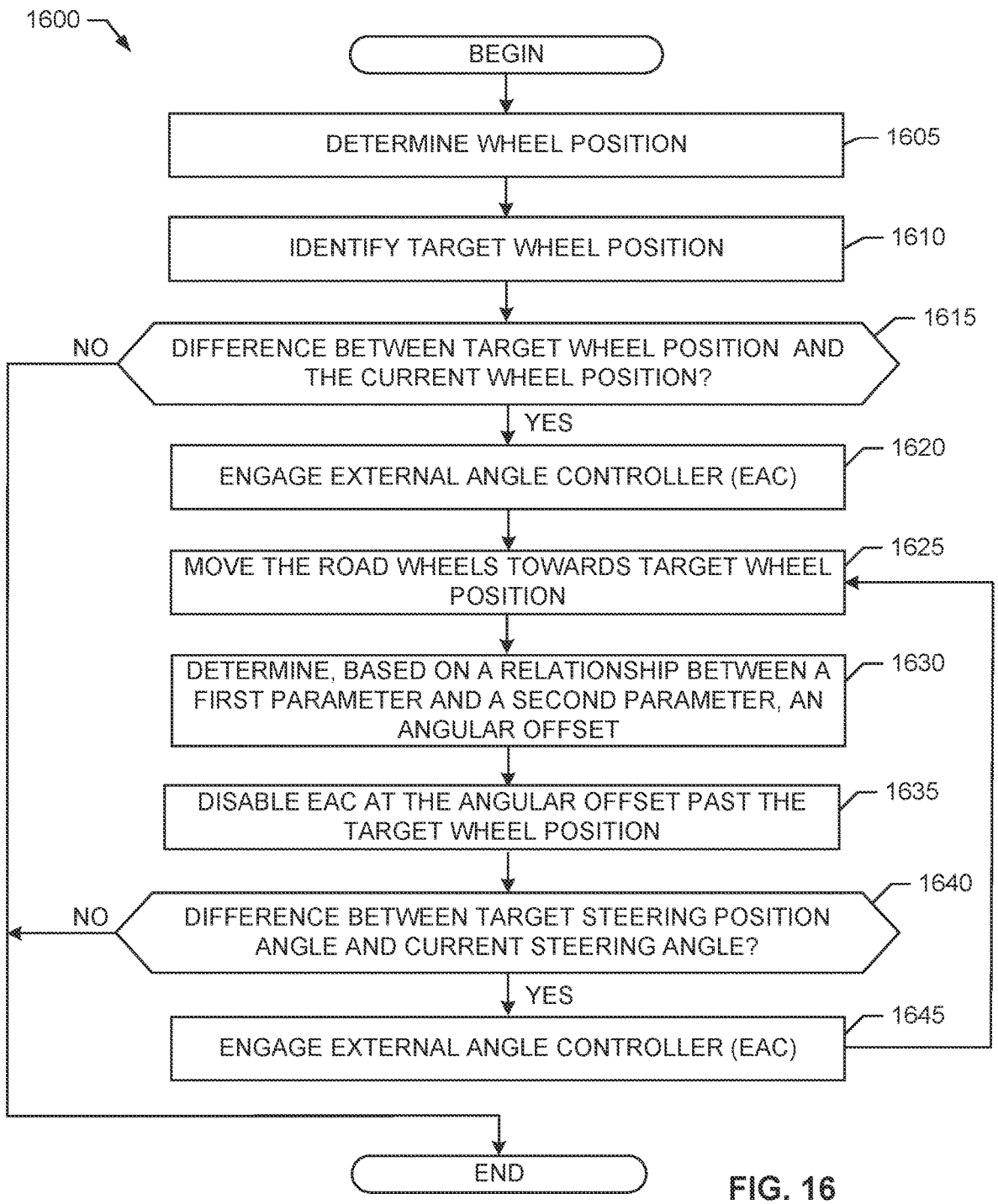
FIG. 16 illustrates another flowchart representative of example machine readable instruction which may be executed to implement the example road wheel angle adjuster of FIG. 10.

Flowcharts representative of example hardware logic circuitry, machine readable instructions, hardware implemented state machines, and/or any combination thereof for implementing the road wheel angle adjuster 804 of FIG. 8 are shown in FIGS. 11, 12 and 16. The machine readable instructions may be one or more executable programs or portion(s) of an executable program for execution by processor circuitry, such as the processor circuitry 1712 shown in the example processor platform 1700 discussed below in connection with FIG. 17 and/or the example processor circuitry discussed below in connection with FIGS. 18 and/or 19. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 11, 12 and 16, many other methods of implementing the example road wheel angle adjust 804 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

FIG. 11 is a flowchart representative of example machine readable instructions and/or example operations 1100 that may be executed and/or instantiated by processor circuitry to fully cycle the position of the road wheels 812A, 812B. The machine readable instructions and/or the operations 1100 of FIG. 11 begin at block 1105, at which the request interface circuitry 1002 detects a request to cycle the position of road wheels. For example, the request interface circuitry 1002 can receive a request from the cycle the position of the road wheels (e.g., move from a first maximum travel to a second maximum travel, etc.) from the user interface 808 and/or autonomous driving interface 809. In some examples, the request interface circuitry 1002 can receive a cycle requests on a periodical basis (e.g., monthly, yearly, etc.) and/or milestone-basis (e.g., every 5,000 miles, every 10,000 miles, etc.) to verify the system health of the steering system 802 and/or the road wheels 812A, 812B.

At block 1110, the wheel position identifier circuitry 1004 determines the initial position of the wheels of the vehicle (e.g., the road wheels 812A, 812B, etc.). For example, the steering position sensor 506 determines the location of the road wheels 812A, 812B relative to the straightly-forward position (e.g., the target position 904 of FIGS. 9A-9E, etc.). In other examples, the wheel position identifier circuitry 1004 can determine the position of the road wheels 812A, 812B by any other suitable means.

At block 1115, the system interface circuitry 1010 cycles the position of the road wheels 812A, 812B. For example, the system interface circuitry 1010 can move the position of the road wheels 812A, 812B from a first maximum travel position (e.g., a maximum clockwise position, etc.) to a second maximum travel position (e.g., a maximum counter-clockwise position, etc.). At block 1120, the road wheel angle adjuster 804 returns the road wheels 812A, 812B to the identified initial position. For example, the road wheel angle adjuster 804 can return the road wheels 812A, 812B to the position identified during the execution of block 1110 via the operations 1200 described below in conjunction of FIG. 12. In other examples, the road wheel angle adjuster 804 can move the road wheels to the initial position by any other suitable process. The operations 1100 end.

FIG. 12 is a flowchart representative of example machine readable instructions and/or example operations 1200 that may be executed and/or instantiated by processor circuitry to move the road wheels 812A, 812B to a requested position. The machine readable instructions and/or the operations 1200 of FIG. 12 begin at block 1205, at which the wheel position identifier circuitry 1004 determines the position of the road wheels 812A, 812B. For example, the steering position sensor 506 determines the location of the road wheels 812A, 812B relative to the straightly-forward position (e.g., the target position 904 of FIGS. 9A-9E, etc.). In other examples, the wheel position identifier circuitry 1004 can determine the position of the road wheels 812A, 812B by any other suitable means.

At block 1210, the request interface circuitry 1002 identifies a target wheel position. For example, the request interface circuitry 1002 can receive a target wheel position from a user (e.g., via a user interface 808 of FIG. 8, etc.). Additionally or alternatively, the request interface circuitry 1002 can receive a target wheel position from an autonomous driving system of the vehicle 800 (e.g., via an autonomous driving interface 809 of FIG. 8, etc.). In some examples, the request interface circuitry 1002 can determine a target position based initial position of the road wheels 812A, 812B prior to fully cycling the wheels during a health check (e.g., the operations 1100 of FIG. 11, etc.) and/or a power interface test (e.g., a test verifying the steering system can draw sufficient power from the batteries of the vehicle 800, etc.). In other examples, the request interface circuitry 1002 can receive a target wheel position via any other suitable means. In other examples, the target wheel position can be generated in response to a parking event (e.g., a command to return the wheels to a straightly forward position after the vehicle 800 parks, etc.).

At block 1215, the difference determiner circuitry 1008 determines if there is a difference between the wheel position and the target wheel position. For example, the difference determiner circuitry 1008 can compare the difference between the wheel position and the target wheel position to a threshold (e.g., 0.5 degrees, 1 degree, 5 degrees, etc.) to determine if there is a difference between the wheel position and the target wheel position. If the difference determiner circuitry 1008 determines there is a difference between the wheel position and target wheel position, the operations 1200 advance to block 1220. If the difference determiner circuitry 1008 determines there is not a difference (e.g., a substantial difference, etc.) between the wheel position and target wheel position, the operations 1200 ends.

At block 1220, the system interface circuitry 1010 engages the external angle controller (EAC) 502. For example, the system interface circuitry 1010 can cause actuators associated with the EAC 502 and/or the steering system 802 to come into contact with a component of the steering system 802 (e.g., the steering column, etc.).

At block 1225, the EAC 502 and/or the system interface circuitry 1010 moves (e.g., adjusts, rotates, etc.) the road wheels 812A, 812B to the target wheel position. For example, the EAC 502 can apply torque to the steering system 802 to move the road wheels 812A, 812B towards the target wheel position. In some examples, the EAC 502 can apply a consistent torque until the target wheel position is reached by the road wheels 812A, 812B. In other examples, the EAC 502 can reduce the applied torque (e.g., linearly, exponentially, etc.) as the target wheel position is neared by the road wheels 812A, 812B. After execution of block 1225, the road wheels 812A, 812B are generally in the condition illustrated in FIG. 9B.

At block 1230, the system interface circuitry 1010 disengages the external angle controller (EAC) 502. For example, the system interface circuitry 1010 can cause actuators associated with EAC 502 and/or the steering system 802 to disengage with a component of the steering system 802 (e.g., the steering column, etc.). In some examples, the disengagement of the EAC 502 causes the position of the road wheels 812A, 812B to rebound from the target position back towards the initial position. After the disengagement of the EAC 502 during the execution of block 1230, the road wheels 812A, 812B are generally in the condition illustrated in FIG. 9C.

At block 1235, the difference determiner circuitry 1008 determines if there is a difference between the current position of the wheels (e.g., following the first recoil rotation 920 of FIG. 9C, etc.) and the target wheel position. For example, the difference determiner circuitry 1008 can compare the difference between the wheel position and the target wheel position to a threshold (e.g., 0.5 degrees, 1 degree, 5 degrees, etc.) to determine if there is a difference between the wheel position and the target wheel position. If the difference determiner circuitry 1008 determines there is a difference between the wheel position and target wheel position, the operations 1200 advance to block 1240. If the difference determiner circuitry 1008 determines there is not a difference between the wheel position and target wheel position, the operations 1200 end.

At block 1240, the difference determiner circuitry 1008 determines the overshoot position (e.g., the third angular displacement 928 of FIG. 9D, etc.). In some examples, the difference determiner circuitry 1008 can determine the magnitude of the angular difference (e.g., the second angular displacement 918 of FIG. 9C, etc.) between the current wheel position (e.g., the third rotational position 916, etc.) and the target wheel position (e.g., the target position 904, etc.). The difference determiner circuitry 1008 can determine the overshoot angle by any other suitable means.

At block 1245, the system interface circuitry 1010 engages the external angle controller (EAC) 502. For example, the system interface circuitry 1010 can cause actuators associated with the EAC 502 and/or the steering system 802 to come into contact with a component of the steering system 802 (e.g., the steering column, etc.).

At block 1250, the EAC 502 and/or the system interface circuitry 1010 moves (e.g., adjusts, rotates, etc.) the road wheels 812A, 812B to a position past the target wheel position equal and opposite to the magnitude of the difference (e.g., the fourth rotational position 924 of FIG. 9D, etc.). For example, the EAC 502 can apply torque to the steering system 802 to move the road wheels 812A, 812B towards the fourth rotational position 924 (e.g., the overshoot position, etc.). In some examples, the EAC 502 can apply a consistent torque until the fourth rotational position 924 (e.g., the overshoot rotational, etc.) is reached by the road wheels 812A, 812B. In other examples, the EAC 502 can reduce the applied torque (e.g., linearly, exponentially, etc.) as the fourth rotational position 924 (e.g., the overshoot position, etc.) is neared by the road wheels 812A, 812B. After execution of block 1225, the road wheels 812A, 812B are generally in the condition illustrated in FIG. 9D.

At block 1255, the system interface circuitry 1010 disengages the external angle controller (EAC) 502. For example, the system interface circuitry 1010 can cause actuators associated with EAC 502 and/or the steering system 802 to disengage with a component of the steering system 802 (e.g., the steering column, etc.). In some examples, the disengagement of the EAC 502 causes the position of the road wheels 812A, 812B to rebound. In some such examples, because the road wheels 812A, 812B moved to the fourth rotational position 924 (e.g., the overshoot position, etc.), the resulting rebound rotation (e.g., the second recoil rotation 934 of FIG. 9E, etc.) causes the road wheels 812A, 812B to reach the target position 904. After the disengagement of the EAC 502 during the execution of block 1230, the road wheels 812A, 812B are generally in the condition illustrated in FIG. 9E. The operations return to block 1215.

FIGS. 13A-13E illustrate various positions of the road wheels 812A, 812B of the axle 810 of FIG. 8 during the adjustment of the road wheels 812A, 812B to a desired position via an alternative technique to the one described with reference to FIGS. 9A, 9B, 9C, 9D, 9E, and 12. When a same reference (e.g., the target position 904, etc.) is used in conjunction with FIGS. 13A-13E, it has the same meaning as the reference used in conjunction with FIGS. 9A, 9B, 9C, 9D, 9E, and 12 unless indicated otherwise. In the illustrated examples of FIGS. 13A-13E, the positions and movements of the first road wheel 812A are described. However, it should be appreciated that the second road wheel 812B undergoes similar movements as the first road wheel 812A during the process illustrated in FIGS. 13A-13E.

Figure 13A:
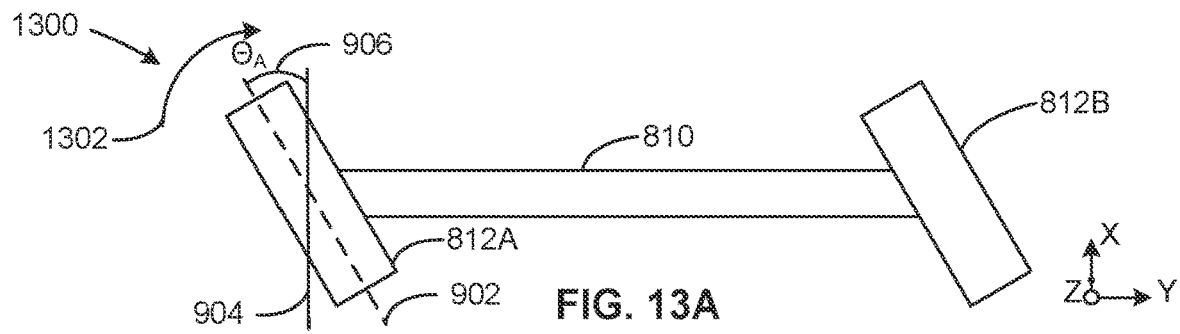
FIGS. 13A-13E illustrate various positions of the wheels of the vehicle of FIG. 8 during the adjustment of the wheels to a desired position via a second technique.

FIG. 13A illustrates the road wheels 812A, 812B in an example first position 1300 has been moved via the steering system 802. In some examples, the first position 1300 corresponds to a position of the road wheels 812A, 812B after the vehicle 100 has been parked (e.g., in a parking space, between other vehicles via parallel parking, etc.).

In the illustrated example of FIG. 13A, the road wheel 812A is at the first rotational position 902 of FIG. 9A. In the illustrated example of FIG. 9A, a command has been issued (e.g., via the user interface 808, via the autonomous driving interface 809, etc.) to move the road wheel 812A into the example target position 904 of FIGS. 9A-9E, which has the angular displacement 906 of FIG. 9A relative to the first rotational position 902. In the illustrated example of FIG. 13A, the angular displacement 906 is labeled as OA. In the illustrated example of FIG. 13A, after receiving the user request, the EAC 502 of FIGS. 5 and 10, via a command from the road wheel angle adjuster 804 (e.g., the system interface circuitry 1010, etc.), causes the steering wheel 200 to undergo an example driven rotation 1302 towards the target position 904.

Figure 13B:
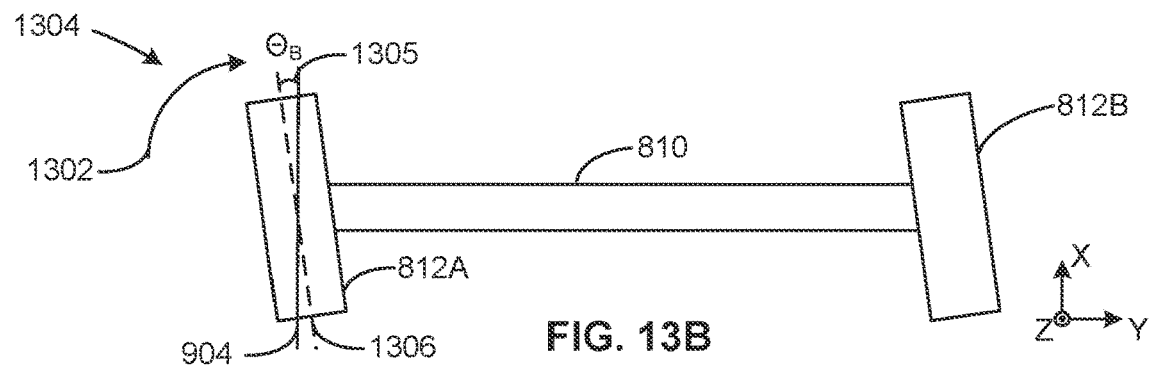

FIG. 13B illustrates the example of the road wheels 812A, 812B in an example second position 1304 while undergoing the driven rotation 1302. In the illustrated example of FIG. 13B, the first road wheel 812A is at an example second rotational position 1306. In the illustrated example of FIG. 13B, the second rotational position 1306 is angularly displaced from the example first rotational position 902 by an example second angular displacement 1305. In the illustrated example of FIG. 13B, the second angular displacement 1305 is illustrated as $\Theta_B$. In the illustrated example of FIG. 13B, the road wheel 812A is undergoing the example driven rotation 1302 of FIG. 13A and the second rotational position 1306 is an intermediate position between the first rotational position 902 and the target position 904. In the illustrated example of FIG. 13B, the second rotational position 1306 represents the position where a first parameter associated with a position of the steering system 802 (e.g., a steering wheel angle, a position of a rack and pinion system, a position of a tie rod, etc.) and a second parameter associated with a load on the steering system 802 (e.g., a load on the rack and pinion system, a load on the steering column, a load on a tie rod of the steering system, a position of the motor associated with the steering system 802, etc.) changes from a first linear relationship to second relationship (e.g., a second linear relationship having a substantially different slope, a non-linear relationship, etc.).

In some examples, the magnitude of the second angular displacement 1305 is stored by the road wheel angle adjuster 804 and/or used to calculate an offset angle, which is described below in conjunction with FIG. 13D. In the illustrated example of FIG. 13B, the second angular displacement 1305 corresponds to the amount of residual force in the steering system 802. Particularly, the second angular displacement 1305 corresponds to the force applied to the steering system 802 and the corresponding movement of the road wheel 812A required to saturate (e.g., tension, etc.) the steering system 102, the suspension system 811, and the tires of the road wheels 812A, 812B. In some examples, empirical observation indicates that the second angular displacement 1305 is approximately equal to the angular offset 1314 of FIG. 13D. Accordingly, in some examples, the magnitude of the second angular displacement 1305 can be used by the road wheel angle adjuster 804 to estimate the required angular offset to compensate for the recoil observation.

Figure 13C:
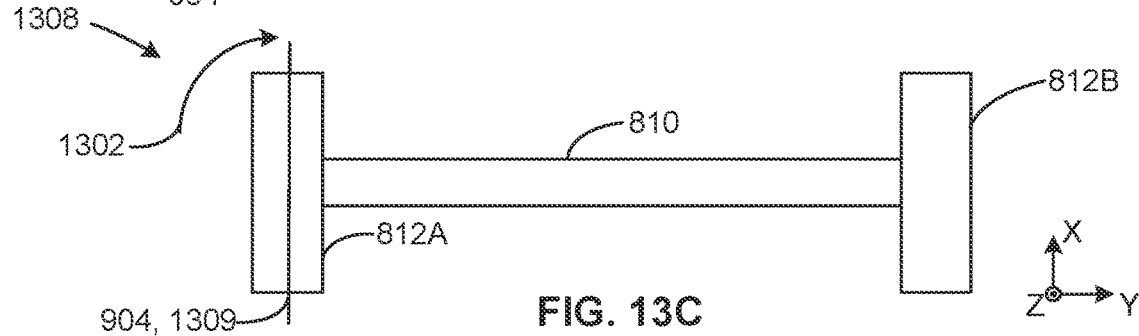

FIG. 13C illustrates the example of the road wheels 812A, 812B in a third position 1308 while undergoing the driven rotation 1302. In the illustrated example of FIG. 13C, the road wheel 812A is at an example third rotational position 1309, which is the target position 904. In the illustrated example of FIG. 13C, the road wheel 812A has reached the target position 904. However, if the driven rotation 1302 were to stop, residual forces (e.g., from the steering system 802 of FIG. 8, the suspension system 811 of FIG. 8, the tires of the road wheels 812A, 812B, etc.) would cause the road wheels 812A, 812B to rotate in an opposite direction of the driven rotation 1302 and no longer be in the target position 904 (e.g., similar to the condition illustrated in FIG. 9C, etc.). Accordingly, the EAC 502 continues to rotate the first road wheel 812A past the target position 904.

Figure 13D:
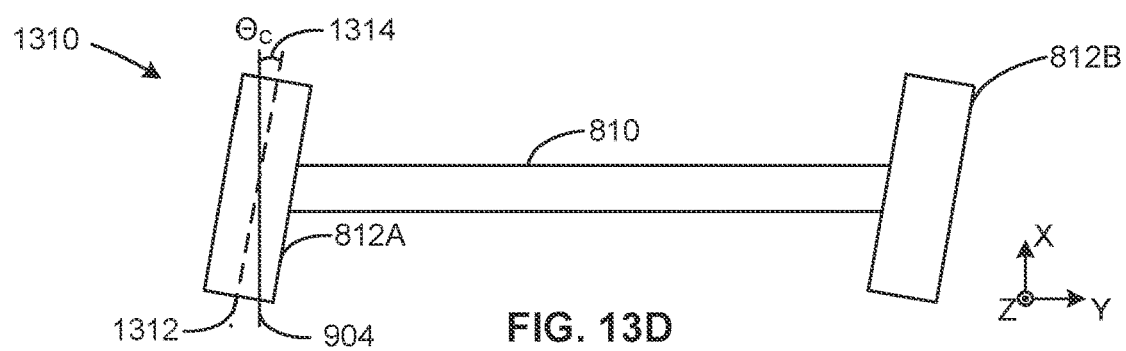

FIG. 13D illustrates the example of the road wheels 812A, 812B in an example fourth position 1310 after the driven rotation 1302 has ceased. In the illustrated example of FIG. 13D, the first road wheel 812A is at an example fourth rotational position 1312. In the illustrated example of FIG. 13D, the fourth rotational position 1312 is offset from the target position 904 by an example angular offset 1314. In the illustrated example of FIG. 13D, the angular offset 1314 is illustrated as $\Theta_C$. In the illustrated example of FIG. 13D, an actuator associated with the EAC 502 remains engaged on a steering column of the steering system 802. In the illustrated example of FIG. 13D, the angular offset 1314 is equal in magnitude to the second angular displacement 1305. In other examples, the angular offset 1314 can be calculated by any other suitable means. The angular offset 1314 is an estimate of the expected recoil rotation associated with the road wheels 812A, 812B, which is described below in relation to FIG. 13E.

Figure 13E:
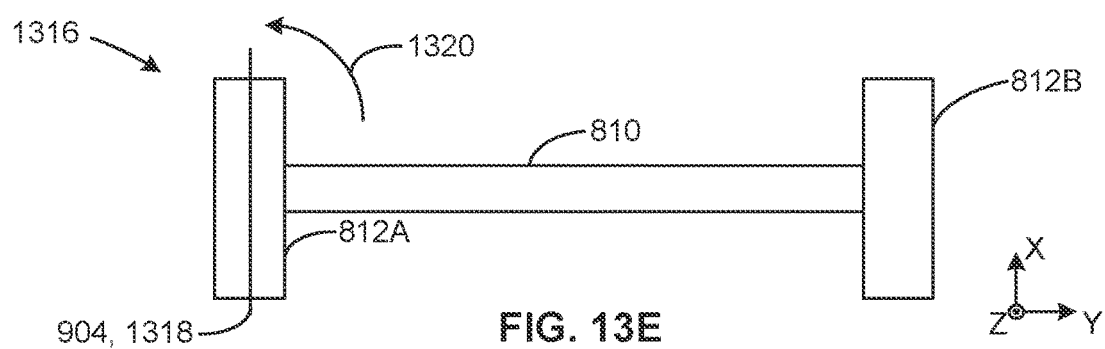

FIG. 13E illustrates the example of the road wheels 812A, 812B in an example fifth position 1316 after the disengagement of an actuator of the EAC 502. The disengagement of EAC 502 causes the first road wheel 812A to undergo an example recoil rotation 1320. In the illustrated example of FIG. 13E, the first road wheel 812A is at an example fifth rotational position 1318, which is the target position 904. Because the road wheel angle adjuster 804 determined the angular offset 1314 to compensate for the recoil rotation 1320, the recoil rotation 1320 causes the first road wheel 812A to rotate back to the target position 904. In some examples, the road wheel angle adjuster 804 can incorrectly determine the angular offset 1314 and not reach the target position 904 after the recoil rotation 1320. In some such examples, the process illustrated in FIGS. 13A-13E and/or FIGS. 9A-9E can be repeated using the fifth rotational position 1318 as the first rotational position 902 of FIGS. 9A and 13A.

Figure 14:
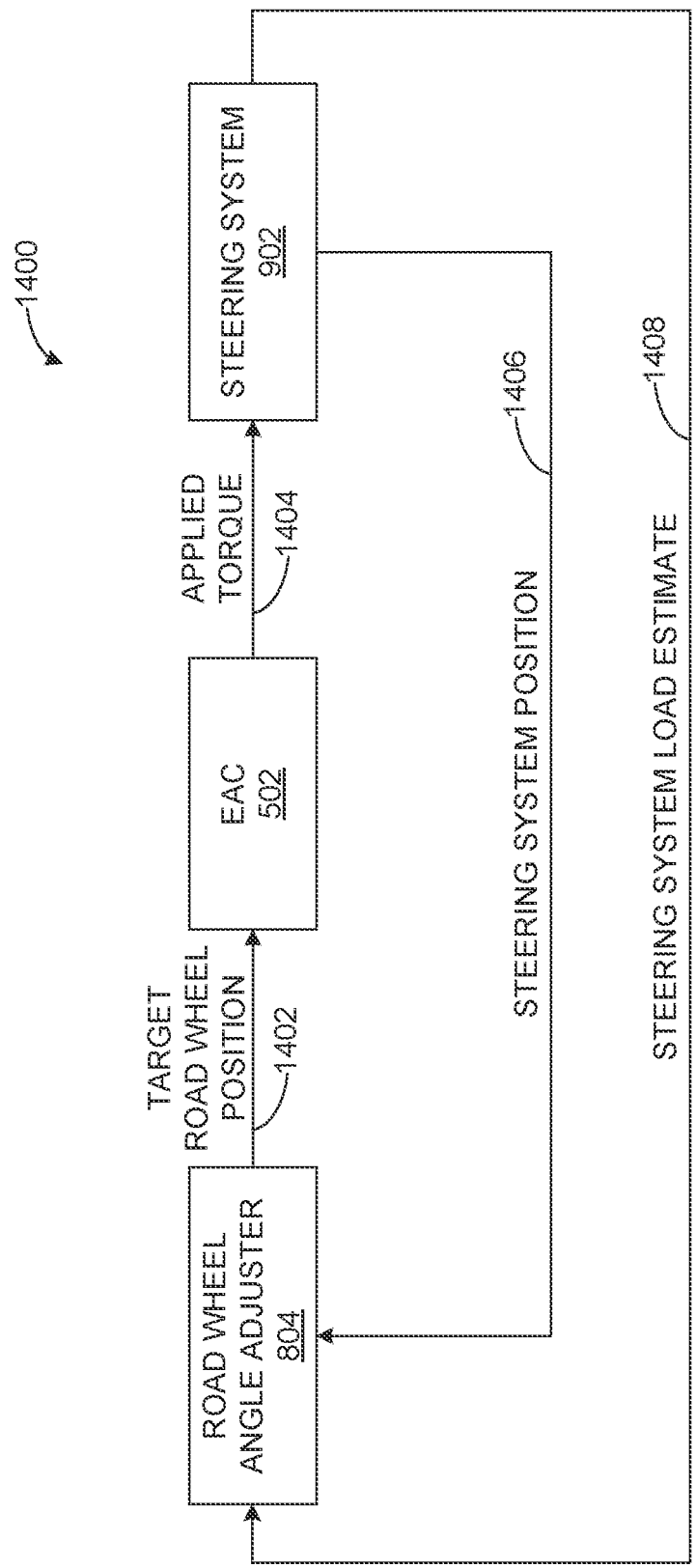
FIG. 14 is a process control diagram that may be used in conjunction with the steering controller of FIGS. 8 and 10.

FIG. 14 is a process control diagram 1400 that may be used in conjunction with the road wheel angle adjuster 804 of FIGS. 8 and 10. In the illustrated example of FIG. 14, the example road wheel angle adjuster 804 of FIGS. 8 and 10 provides a feedforward signal 1402 to the example EAC 502 of FIGS. 5 and 10. In the illustrated example of FIG. 14, the EAC 502 applies a torque 1404 to the steering system 802, which provides an example first feedback signal 1406 and an example second feedback signal 1408 to the road wheel angle adjuster 804. While described herein as electrical signals (e.g., wired electrical signals, wireless electrical signals, etc.), the signals 1402, 1406, 1408 can be any other suitable types of signals (e.g., hydraulic signals, mechanical signals, pneumatic signals, etc.).

In the illustrated example of FIG. 14, the road wheel angle adjuster 804, in response to a user request to move the road wheels 812A, 812B, provides a feedforward signal 1402 to the EAC 502 to move the road wheels 812A, 812B to a target position (e.g., the target position 904, etc.). The EAC 502 applies a torque 1404 to the steering system 802, thereby causing the steering system 802 and the road wheels 812A, 812B to rotate. As the road wheels 812A, 812B rotate, the steering sensors 806 provide the feedback signals 1406 to the road wheel angle adjuster 804. In the illustrated example of FIG. 14, The feedback signals 1406, 1408 enables the offset determiner circuitry 1009 to determine the offset angle. In some examples, the first feedback signal 1406 corresponds to the position of the road wheels 1814A, 1814B, a position of a motor of a power steering system, a position of rack of the rack and pinion of the steering system 802, etc. In some examples, the second feedback signal 1408 corresponds to a load on the steering system 802, which can be determined based on the data from steering sensors 806 and/or properties of the steering system 802 (e.g., geometric properties, material properties, etc.). In other examples, the feedback signal 1408 can be determined directly by a sensor (e.g., a strain gauge, etc.) disposed on the steering system 802.

Figure 15:
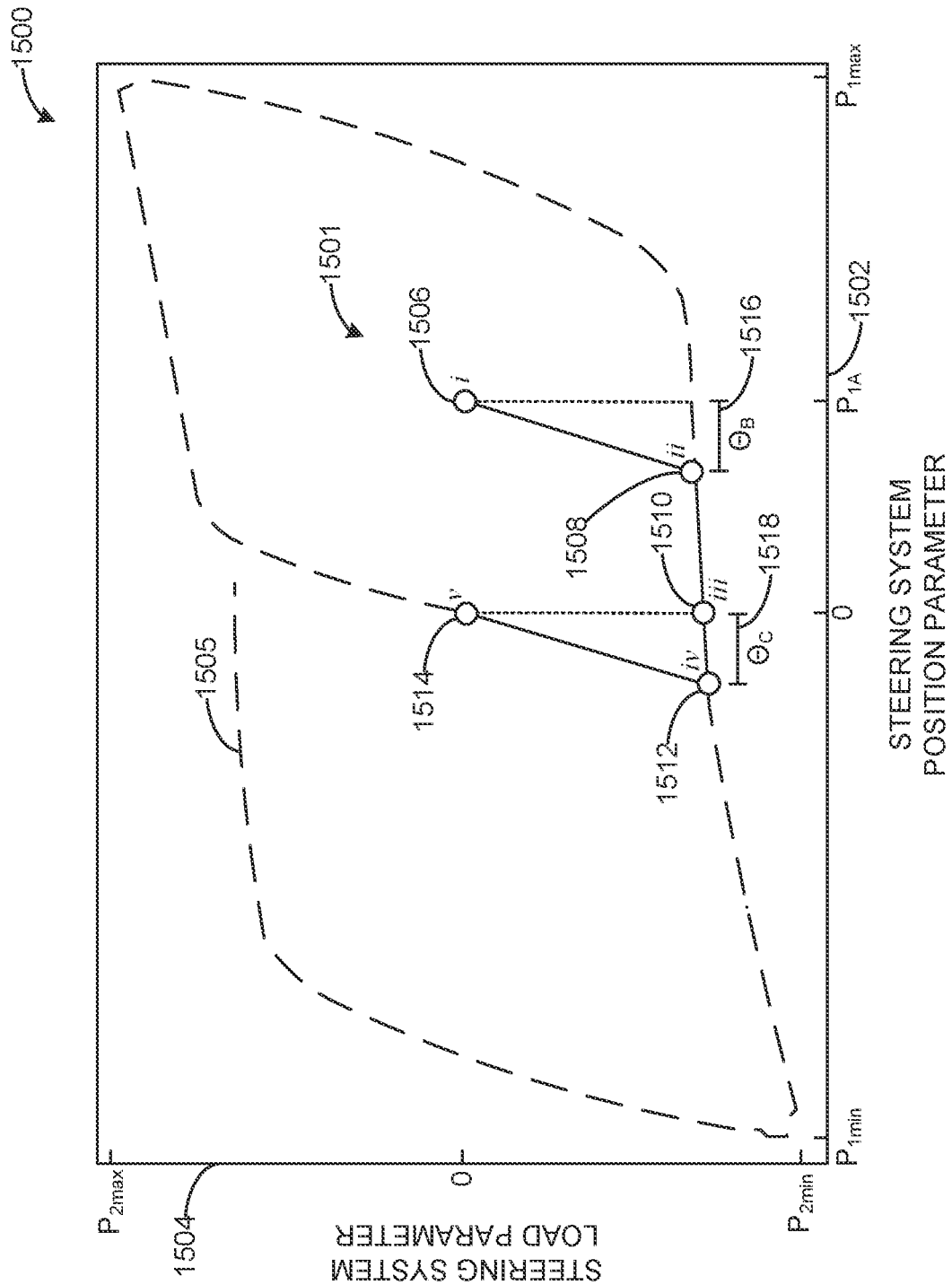
FIG. 15 is a diagram illustrating an operation related to the process control diagram of FIG. 14 and/or the illustrations of FIGS. 13A-13E.

FIG. 15 is a diagram 1500 illustrating an example operation 1501 to the center the steering system 802 related to the process control diagram of FIG. 5. In the illustrated example, the diagram 1500 includes an example x-axis 1502, corresponding to a position of a steering system, and an example y-axis 1504, corresponding to a load on a steering system. The example diagram 1500 illustrates an example relationship curve 1505 between the position of the steering system and the load on the steering system. During operation of the road wheel angle adjuster 804, the steering system 802 begins at an example first state 1506 and moves sequentially through an example second state 1508, an example third state 1510, an example fourth state 1512, and an example fifth state 1514. The first state 1506 generally corresponds to the state of the first road wheel 812A in FIG. 13A. The second state 1508 generally corresponds to the state of the first road wheel 812A in FIG. 13B. The third state 1510 generally corresponds to the state of the first road wheel 812A in FIG. 13C. The fourth state 1512 generally corresponds to the state of the first road wheel 812A in FIG. 13D. The fifth state 1514 generally corresponds to the state of the first road wheel 812A in FIG. 13E.

The example x-axis 1502 reflects the position of the steering system 802. For example, the parameter measured on the x-axis 1502 can include an angular position of the first road wheel 812A of FIGS. 8, 9A-9E, and 13A-13E or another analogous parameter (e.g., a position of the tie rod of the steering system 802, a position of the rack and pinion system of the steering system 802, a position of the motor of the power steering system, a rack displacement, a pinion angle, a position/angle of a motor associated with the wheels 812A, 812B, etc.). The minimum value of the x-axis 1502 (illustrated as $P_{1min}$) corresponds to a maximum travel of the steering system 802 in a particular rotational direction (e.g., counterclockwise, etc.). The maximum value of the x-axis 1502 (illustrated as $P_{1max}$) corresponds to a maximum travel of the steering system 802 in the other rotational direction (e.g., clockwise, etc.). In the illustrated example of FIG. 15, the center of the x-axis represents the centered position of the steering system 802 and/or a straightly-forward position of the first road wheel 812A (illustrated as 0).

The example y-axis 1504 reflects a load on the steering system 802. For example, the parameter measured on the y-axis 1504 can include a load on the rack of the rack and pinion system of the steering system 802 or another analogous parameter (e.g., a load on a tie rod of the steering system 802, a load on the steering system, etc.). The minimum value of the y-axis 1504 (illustrated as $P_{2min}$) corresponds to the load of the steering system 802 associated with a corresponding maximum travel of the steering system 802 in a particular rotational direction (e.g., counterclockwise, etc.). The maximum value of the y-axis 1504 (illustrated as $P_{2max}$) corresponds to the load of the steering system 802 associated with a corresponding maximum travel of the steering system 802 in the other rotational direction (e.g., clockwise, etc.). In the illustrated example of FIG. 15, the center of the y-axis represents a load of zero on the steering system 802 (illustrated as 0), which generally corresponds to a state where the EAC 502 is not engaged.

The relationship curve 1505 illustrates the relationship between the first parameter of the x-axis 1502 and the second parameter of the y-axis 1504. In the illustrated example of FIG. 15, the relationship curve 1505 represents the relationship between the parameters when the steering system 802 is loaded (e.g., the EAC 502 is engaged, etc.). As such, in some examples (e.g., moving between the first state 1506 and the second state 1508, etc.), the initial loading and/or movement may be necessary to cause the steering system 802 to move on the relationship curve 1505.

In the illustrated example of FIG. 15, the steering system 802 begins in the first state 1506. In the first state 1506, the vehicle 800 is stationary (e.g., parked, etc.) and the steering system 802 is in a non-centered position (illustrated as $P_{1a}$) and a user of the vehicle 800 requests the first road wheel 812A of FIG. 2 be moved to the straightly forward position. The EAC 502 engages the steering system 802 (e.g., the steering column, etc.) applies a load to the steering system 802, which increases the magnitude of the total load on the steering system 802 and moves the position of the steering system 802 towards the straightly-forward position. When the steering system 802 reaches the second state 1508 (e.g., the saturated state, etc.), the road wheel angle adjuster 804 can record (e.g., store, note, etc.) an example angular displacement 1516 (illustrated as $\Theta_B$) of the steering system 802 between the first state 1506 and the second state 1508. The angular displacement 1516 corresponds to a portion of the operation 1501 where the relationship between the steering load parameter and the steering position parameter has a first linear relationship (e.g., a first slope, etc.). In some examples, the angular displacement 1516 is associated with steering load required to overcome the residual forces of the steering system 802 of FIG. 8, the suspension system 811 of FIG. 1, and/or the tires of the road wheels 812A, 812B.

After the operation 1501 has reached the second state 1508, the EAC 502 continues to apply torque to the steering column, which continues to change the position of the steering system 802 until the third state 1510 (e.g., loaded straightly forward state, etc.) is reached. As the EAC 502 continues to apply torque to the system, the relationship between the steering load parameter and the steering position parameter changes from the first linear relationship to a second relationship (e.g., a second linear relationship, a non-linear relationship, etc.). While the transition between the second state 1508 and the third state 1510 is depicted as linear, in other examples, the transition can have any suitable relationship (e.g., quadratic, hyperbolic, trigonometric, etc.). In the third state 1510, the steering system 802 is straightly forward (e.g., the steering wheel 102 centered, etc.). However, if the EAC 502 is disengaged, the residual force remaining in the steering system 802 will cause the steering system 802 to recoil towards the initial position of the steering system 802. As such, the EAC 502 continues to apply torque to the steering column 201 until the fourth state 1512 (e.g., the overshoot position, etc.) is reached. In the illustrated example of FIG. 15, the fourth state 1512 is displaced along the x-axis 1502 by an example offset displacement 1518 (illustrated as $\Theta_C$). In the illustrated example of FIG. 15, the offset displacement 1518 is approximately equal in magnitude to the angular displacement 1516. In other examples, the relationship between the offset displacement 1518 and the angular displacement 1516 can be any suitable value. After the operation 1501 reaches the fourth state 1512, the EAC 502 is disengaged. The residual load on the steering system 802 causes the steering system 802 to undergo a recoil rotation to the fifth state 1514. Because the position of the fourth state 1512 on the x-axis was determined to compensate for this recoil rotation, the fifth state 1514 is a position where there is no load on the steering system 802 and the steering system 802 is centered and the road wheels 812A, 812B are in a straightly forward position.

FIG. 16 is a flowchart representative of example machine readable instructions and/or example operations 1600 that may be executed and/or instantiated by processor circuitry to move the road wheels 812A, 812B to a requested position in a manner corresponding to the process illustrated in FIGS. 13A-13E. The machine readable instructions and/or the operations 1600 of FIG. 16 begin at block 1605, at which the wheel position identifier circuitry 1004 determines the position of the road wheels 812A, 812B. For example, the steering position sensor 506 determines the location of the road wheels 812A, 812B relative to the straightly-forward position (e.g., the target position 904 of FIGS. 13A-13E, etc.). In other examples, the wheel position identifier circuitry 1004 can determine the position of the road wheels 812A, 812B by any other suitable means.

At block 1610, the request interface circuitry 1002 identifies a target wheel position. For example, the request interface circuitry 1002 can receive a target wheel position from a user (e.g., via a user interface 808 of FIG. 8, etc.). Additionally or alternatively, the request interface circuitry 1002 can receive a target wheel position from an autonomous driving system of the vehicle 800 (e.g., via an autonomous driving interface 809 of FIG. 8, etc.). In some examples, the request interface circuitry 1002 can determine a target position based initial position of the road wheels 812A, 812B prior to fully cycling the wheels during a health check (e.g., the operations 1100 of FIG. 11, etc.) and/or a power interface test (e.g., a test verifying the steering system can draw sufficient power from the batteries of the vehicle 800, etc.). In other examples, the request interface circuitry 1002 can receive a target wheel position via any other suitable means. In other examples, the target wheel position can be generated in response to a parking event (e.g., a command to return the wheels to a straightly forward position after the vehicle 800 parks, etc.).

At block 1615, the difference determiner circuitry 1008 determines if there is a difference between the wheel position and the target wheel position. For example, the difference determiner circuitry 1008 can compare the difference between the wheel position and the target wheel position to a threshold (e.g., 0.5 degrees, 1 degree, 5 degrees, etc.) to determine if there is a difference between the wheel position and the target wheel position. If the difference determiner circuitry 1008 determines there is a difference between the wheel position and target wheel position, the operations 1600 advance to block 1620. If the difference determiner circuitry 1008 determines there is not a difference (e.g., a substantial difference, etc.) between the wheel position and target wheel position, the operations 1600 ends.

At block 1620, the system interface circuitry 1010 engages the external angle controller (EAC) 502. For example, the system interface circuitry 1010 can cause actuators associated with the EAC 502 and/or the steering system 802 to come into contact with a component of the steering system 802 (e.g., the steering column, etc.).

At block 1625, the steering assist interface circuitry 1010 moves the road wheel 812A towards the target position 904. For example, the steering assist interface circuitry 1010 can engage an actuator associated with the EAC 502 to apply a torque to the steering system 802 (e.g., a steering column, etc.) and thereby cause the road wheels 812A, 812B to rotate towards the target position (e.g., clockwise or counterclockwise, etc.). In some examples, the steering assist interface circuitry 1010 can be a closed-loop process and incorporate readings from steering sensors 806 can provide feedback regarding the position of the first road wheel 812A and/or the second road wheel 812B.

At block 1630, the offset angle determiner circuitry 1009 determines, based on the relationship between a first parameter and a second parameter, an angular offset (e.g., the angular offset 1314 of FIG. 13D, etc.). For example, the offset angle determiner circuitry 1009 can determine the offset angle based on an expected recoil rotation caused by the disengagement of the EAC 502. In some such examples, the offset angle determiner circuitry 1009 determines the angular offset 1314 based on a relationship between parameters of the sensor data collected during the initial actuation of the road wheels 812A, 812B via the steering assist interface circuitry 1010 at block 1625. For example, the offset angle determiner circuitry 1009 can, during the initial articulation of the road wheels 812A, 812B based on sensor data (e.g., the feedback signals 1406, 1408, etc.), determine the rotational displacement (e.g., an angular segment, etc.) over which the mathematical relationship between a first parameter associated with a position of the steering system 802 (e.g., steering wheel angle, a position of a pinion on a rack, a tie rod position, etc.) and a second parameter associated with a load on a steering system 802 (e.g., a load on a tie rod, a load on a rack, etc.) changes from a first linear relationship to a second relationship (e.g., a second linear relationship, a non-linear relationship, etc.).

At block 1635, the system interface circuitry 1010 disengages the EAC 502 at the angular offset 1314 (e.g., $\Theta_C$ of FIG. 13D, etc.) past the target position 904. For example, the system interface circuitry 1010, can via feedback (e.g., the feedback signals 1406, 1408 of FIG. 14) from the steering sensors 806, determine the current position of the road wheel 812A is the angular offset 1314 past the target position. In some examples, the disengagement of the EAC 502 causes the road wheels 812A, 812B to undergo a recoil rotation (e.g., the recoil rotation 1320 of FIG. 13E, etc.).

At block 1640, the difference determiner circuitry 1008 determines if there is a difference between the current position of the wheels (e.g., following the recoil rotation 1320 of FIG. 13E, etc.) and the target wheel position 904. For example, the difference determiner circuitry 1008 can compare the difference between the fifth rotational position 1318 and the target wheel position 904 to a threshold (e.g., 0.5 degrees, 1 degree, 5 degrees, etc.) to determine if there is a difference between the fifth rotational position 1318 and the target wheel position 904. If the difference determiner circuitry 1008 determines there is a difference between the fifth rotational position 1318 and target wheel position 904, the operations 1200 advance to block 1240. If the difference determiner circuitry 1008 determines there is not a difference between the fifth rotational position 1318 and target wheel position 904, the operations 1200 end.

At block 1645, the system interface circuitry 1010 engages the external angle controller (EAC) 502. For example, the system interface circuitry 1010 can cause actuators associated with the EAC 502 and/or the steering system 802 to come into contact with a component of the steering system 802 (e.g., the steering column, etc.). The operations return to block 1625.

Figure 17:
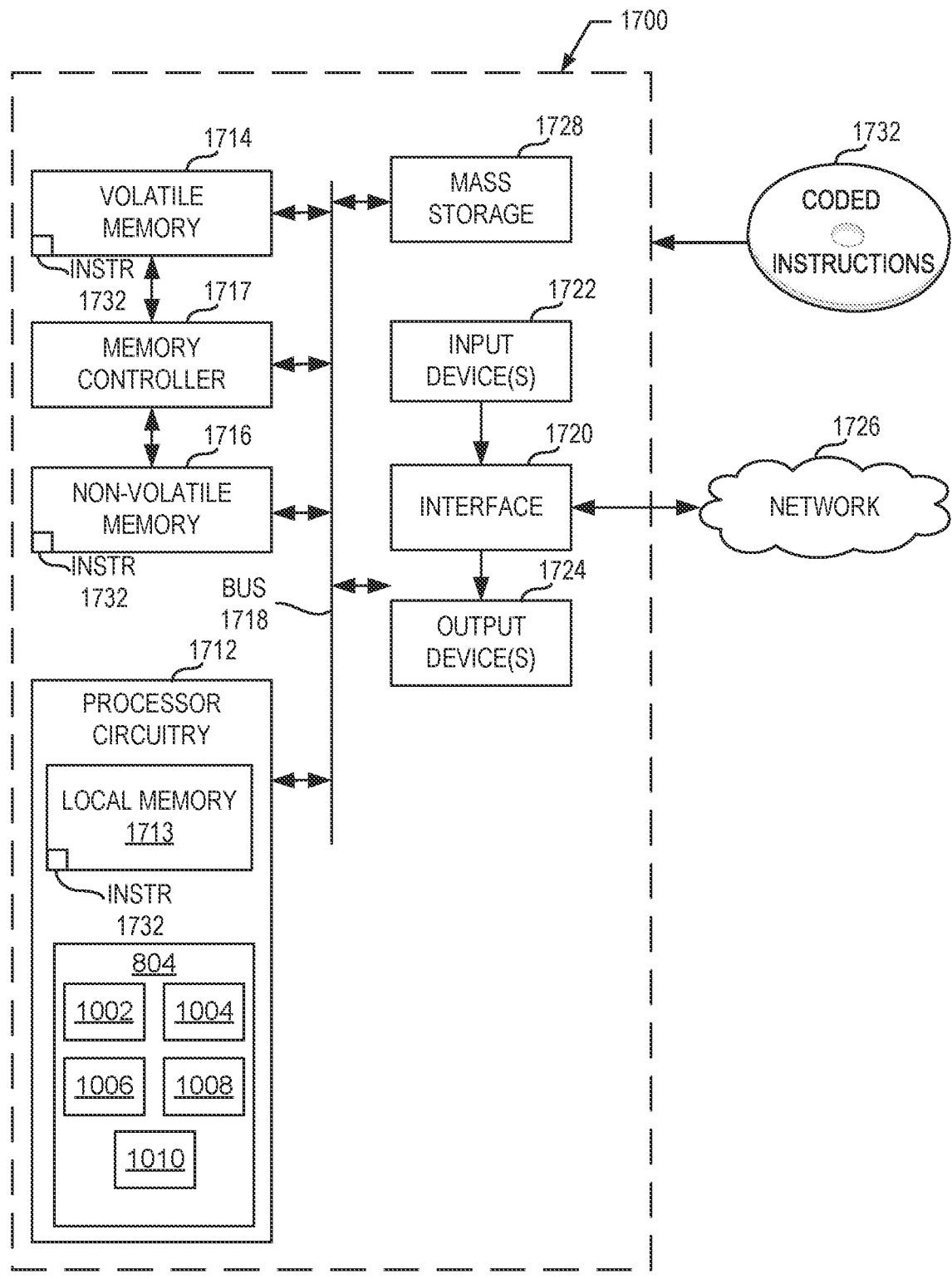
FIG. 17 is a block diagram of an example processing platform structured to execute the instructions of FIGS. 11, 12, and 16 to implement the example road wheel angle adjuster of FIGS. 8 and 10.

FIG. 17 is a block diagram of an example processor platform 1700 structured to execute and/or instantiate the machine readable instructions and/or the operations of FIGS. 11-12 to implement the road wheel angle adjuster 804 of FIGS. 8 and 10. The processor platform 1700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a headset (e.g., an augmented reality (AR) headset, a virtual reality (VR) headset, etc.) or other wearable device, or any other type of computing device.

The processor platform 1700 of the illustrated example includes processor circuitry 1712. The processor circuitry 1712 of the illustrated example is hardware. For example, the processor circuitry 1712 can be implemented by one or more integrated circuits, logic circuits, FPGAs, microprocessors, CPUs, GPUs, DSPs, and/or microcontrollers from any desired family or manufacturer. The processor circuitry 1712 may be implemented by one or more semiconductor based (e.g., silicon based) devices. In this example, the processor circuitry 1712 implements the request interface circuitry 1002, the wheel position identifier circuitry 1004, the wheel position modifier circuitry 1006, the difference determiner circuitry 1008, the system interface circuitry 1010. The processor circuitry 1712 of the illustrated example includes a local memory 1713 (e.g., a cache, registers, etc.). The processor circuitry 1712 of the illustrated example is in communication with a main memory including a volatile memory 1714 and a non-volatile memory 1716 by a bus 1718. The volatile memory 1714 may be implemented by Synchronous Dynamic Random Access Memory (SDRAM), Dynamic Random Access Memory (DRAM), RAIVIBUS® Dynamic Random Access Memory (RDRAM®), and/or any other type of RAM device. The non-volatile memory 1716 may be implemented by flash memory and/or any other desired type of memory device. Access to the main memory 1714, 1716 of the illustrated example is controlled by a memory controller 1717.

The processor platform 1700 of the illustrated example also includes interface circuitry 1720. The interface circuitry 1720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1722 are connected to the interface circuitry 1720. The input device(s) 1722 permit(s) a user to enter data and/or commands into the processor circuitry 1712. The input device(s) 1722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1724 are also connected to the interface circuitry 1720 of the illustrated example. The output device(s) 1724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1720 of the illustrated example, thus, typically includes a graphics driver card, a graphics driver chip, and/or graphics processor circuitry such as a GPU.

The interface circuitry 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1700 of the illustrated example also includes one or more mass storage devices 1728 to store software and/or data. Examples of such mass storage devices 1728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1732, which may be implemented by the machine readable instructions of FIGS. 11, 12, and 16, may be stored in the mass storage device 1728, in the volatile memory 1714, in the non-volatile memory 1716, and/or on a removable non-transitory computer readable storage medium such as a CD or DVD.

Figure 18:
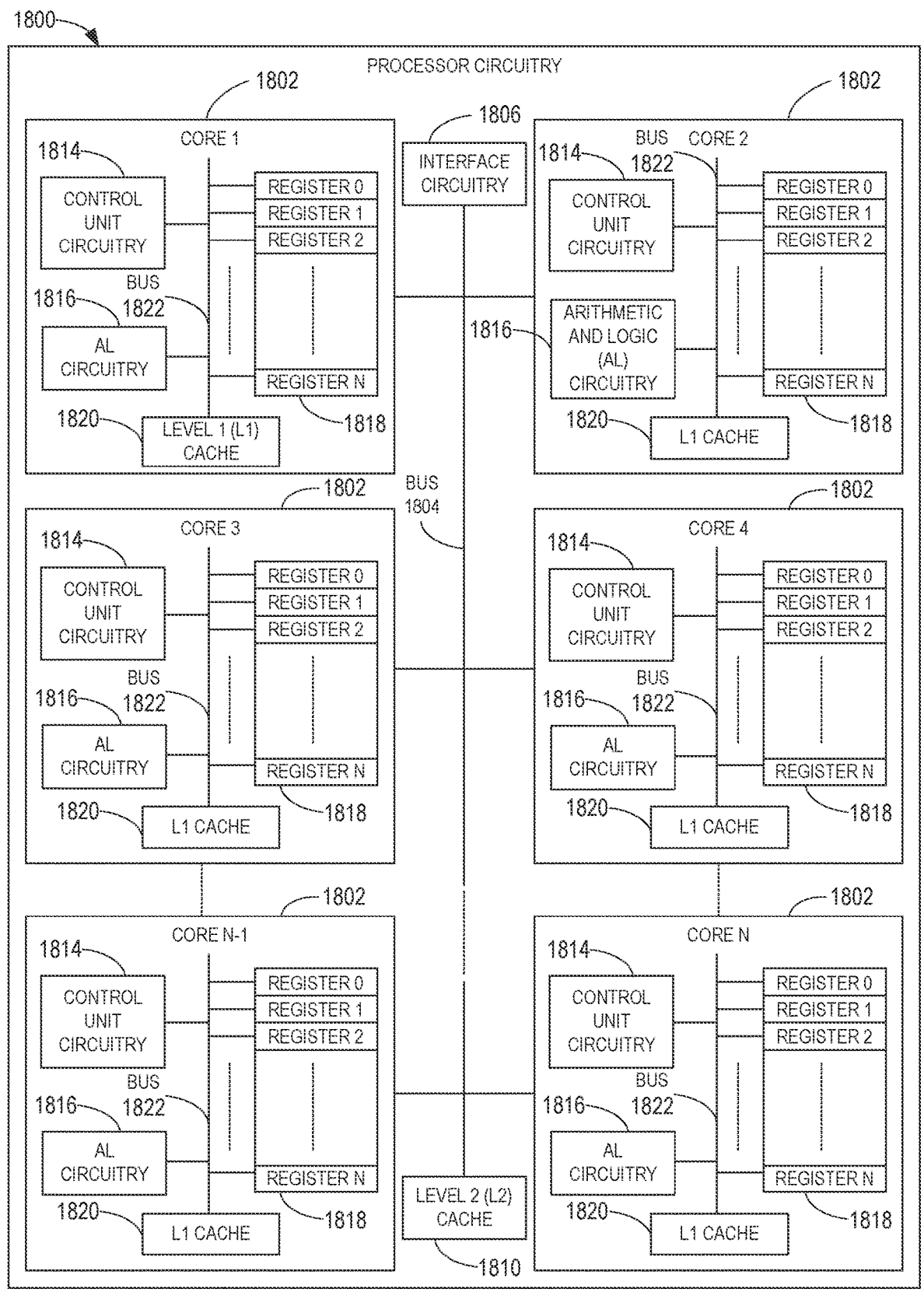
FIG. 18 is a block diagram of an example implementation of the processor circuitry of FIG. 17.

FIG. 18 is a block diagram of an example implementation of the processor circuitry 1712 of FIG. 17 and/or the processor circuitry 712 of FIG. 7. In this example, the processor circuitry 1712 of FIG. 17 and/or the processor circuitry 712 of FIG. 7 is implemented by a general purpose microprocessor 1800. The general purpose microprocessor circuitry 1800 executes some or all of the machine readable instructions of the flowcharts of FIGS. 6, 11, and 12 to effectively instantiate the circuitry of FIGS. 5 and 10 as logic circuits to perform the operations corresponding to those machine readable instructions. In some such examples, the circuitry of FIGS. 5 and 10 is instantiated by the hardware circuits of the microprocessor 1800 in combination with the instructions. For example, the microprocessor 1800 may implement multi-core hardware circuitry such as a CPU, a DSP, a GPU, an XPU, etc. Although it may include any number of example cores 1802 (e.g., 1 core), the microprocessor 1800 of this example is a multi-core semiconductor device including N cores. The cores 1802 of the microprocessor 1800 may operate independently or may cooperate to execute machine readable instructions. For example, machine code corresponding to a firmware program, an embedded software program, or a software program may be executed by one of the cores 1802 or may be executed by multiple ones of the cores 1802 at the same or different times. In some examples, the machine code corresponding to the firmware program, the embedded software program, or the software program is split into threads and executed in parallel by two or more of the cores 1802. The software program may correspond to a portion or all of the machine readable instructions and/or operations represented by the flowcharts of FIGS. 6, 11, and 12.

The cores 1802 may communicate by a first example bus 1804. In some examples, the first bus 1804 may implement a communication bus to effectuate communication associated with one(s) of the cores 1802. For example, the first bus 1804 may implement at least one of an Inter-Integrated Circuit (I2C) bus, a Serial Peripheral Interface (SPI) bus, a PCI bus, or a PCIe bus. Additionally or alternatively, the first bus 1804 may implement any other type of computing or electrical bus. The cores 1802 may obtain data, instructions, and/or signals from one or more external devices by example interface circuitry 1806. The cores 1802 may output data, instructions, and/or signals to the one or more external devices by the interface circuitry 1806. Although the cores 1802 of this example include example local memory 1820 (e.g., Level 1 (L1) cache that may be split into an L1 data cache and an L1 instruction cache), the microprocessor 1800 also includes example shared memory 1810 that may be shared by the cores (e.g., Level 2 (L2_cache)) for high-speed access to data and/or instructions. Data and/or instructions may be transferred (e.g., shared) by writing to and/or reading from the shared memory 1810. The local memory 1820 of each of the cores 1802 and the shared memory 1810 may be part of a hierarchy of storage devices including multiple levels of cache memory and the main memory (e.g., the main memory 1714, 1716 of FIG. 17, the main memory 714, 716 of FIG. 7, etc.). Typically, higher levels of memory in the hierarchy exhibit lower access time and have smaller storage capacity than lower levels of memory. Changes in the various levels of the cache hierarchy are managed (e.g., coordinated) by a cache coherency policy.

Figure 19:
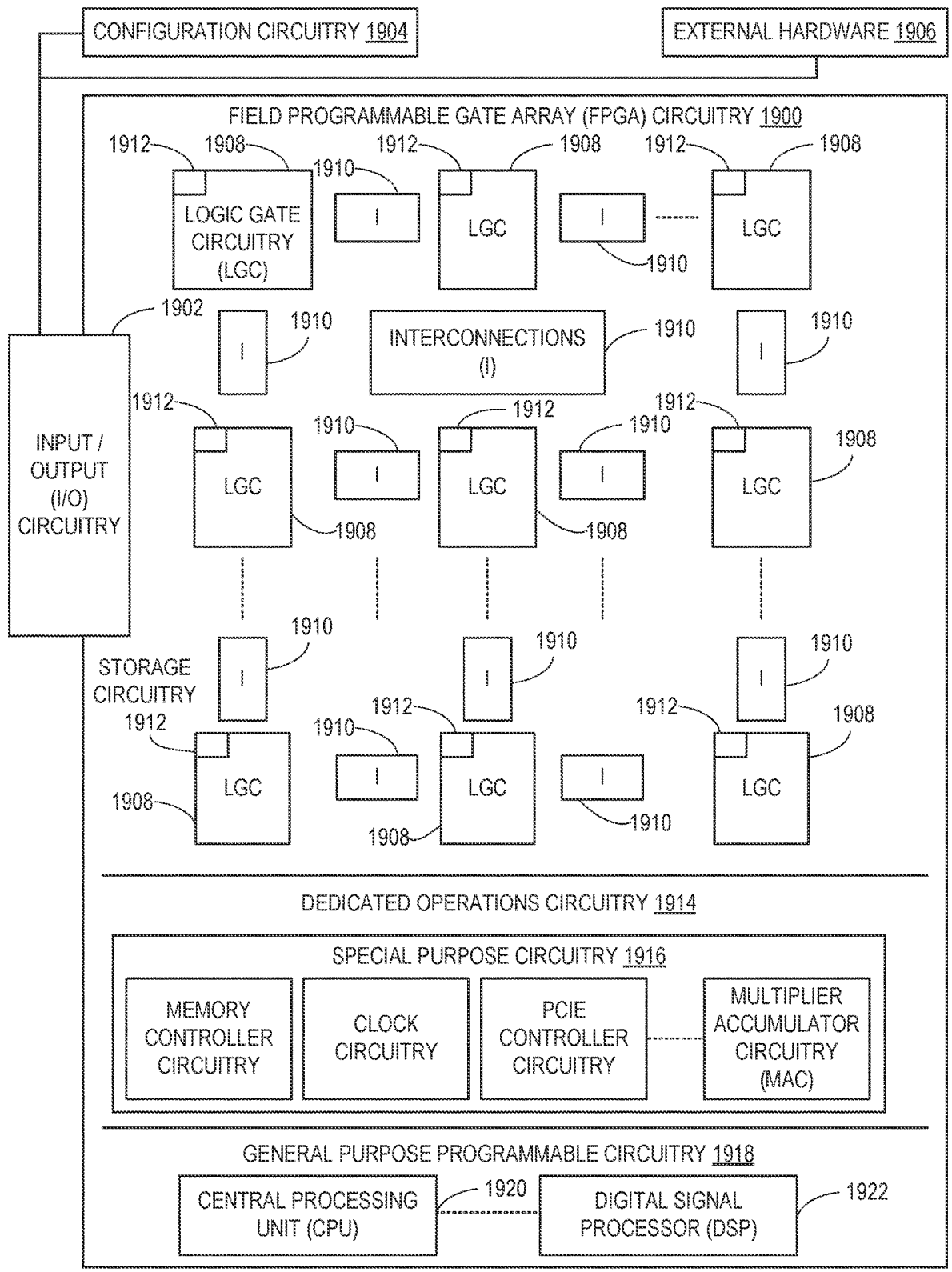
FIG. 19 is a block diagram of another example implementation of the processor circuitry of FIG. 17.

Each core 1802 may be referred to as a CPU, DSP, GPU, etc., or any other type of hardware circuitry. Each core 1802 includes control unit circuitry 1814, arithmetic and logic (AL) circuitry (sometimes referred to as an ALU) 1816, a plurality of registers 1818, the L1 cache 1820, and a second example bus 1822. Other structures may be present. For example, each core 1802 may include vector unit circuitry, single instruction multiple data (SIMD) unit circuitry, load/store unit (LSU) circuitry, branch/jump unit circuitry, floating-point unit (FPU) circuitry, etc. The control unit circuitry 1814 includes semiconductor-based circuits structured to control (e.g., coordinate) data movement within the corresponding core 1802. The AL circuitry 1816 includes semiconductor-based circuits structured to perform one or more mathematic and/or logic operations on the data within the corresponding core 1802. The AL circuitry 1816 of some examples performs integer based operations. In other examples, the AL circuitry 1816 also performs floating point operations. In yet other examples, the AL circuitry 1816 may include first AL circuitry that performs integer based operations and second AL circuitry that performs floating point operations. In some examples, the AL circuitry 1816 may be referred to as an Arithmetic Logic Unit (ALU). The registers 1818 are semiconductor-based structures to store data and/or instructions such as results of one or more of the operations performed by the AL circuitry 1816 of the corresponding core 1802. For example, the registers 1818 may include vector register(s), SIMD register(s), general purpose register(s), flag register(s), segment register(s), machine specific register(s), instruction pointer register(s), control register(s), debug register(s), memory management register(s), machine check register(s), etc. The registers 1818 may be arranged in a bank as shown in FIG. 19. Alternatively, the registers 1818 may be organized in any other arrangement, format, or structure including distributed throughout the core 1802 to shorten access time. The second bus 1822 may implement at least one of an I2C bus, a SPI bus, a PCI bus, or a PCIe bus.

Each core 1802 and/or, more generally, the microprocessor 1800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

FIG. 19 is a block diagram of another example implementation of the processor circuitry 1712 of FIG. 17 and/or the processor circuitry 712 of FIG. 7. In this example, the processor circuitry 1712 and/or the processor circuitry 712 are/is implemented by FPGA circuitry 1900. The FPGA circuitry 1900 can be used, for example, to perform operations that could otherwise be performed by the example microprocessor 1800 of FIG. 18 executing corresponding machine readable instructions. However, once configured, the FPGA circuitry 1900 instantiates the machine readable instructions in hardware and, thus, can often execute the operations faster than they could be performed by a general purpose microprocessor executing the corresponding software.

More specifically, in contrast to the microprocessor 1800 of FIG. 18 described above (which is a general purpose device that may be programmed to execute some or all of the machine readable instructions represented by the flowcharts of FIGS. 6, 11, and 12 but whose interconnections and logic circuitry are fixed once fabricated), the FPGA circuitry 1900 of the example of FIG. 19 includes interconnections and logic circuitry that may be configured and/or interconnected in different ways after fabrication to instantiate, for example, some or all of the machine readable instructions represented by the flowchart of FIGS. 6, 11, 12, and 16. In particular, the FPGA 1900 may be thought of as an array of logic gates, interconnections, and switches. The switches can be programmed to change how the logic gates are interconnected by the interconnections, effectively forming one or more dedicated logic circuits (unless and until the FPGA circuitry 1900 is reprogrammed). The configured logic circuits enable the logic gates to cooperate in different ways to perform different operations on data received by input circuitry. Those operations may correspond to some or all of the software represented by the flowcharts of FIGS. 6, 11, 12, and 16. As such, the FPGA circuitry 1900 may be structured to effectively instantiate some or all of the machine readable instructions of the flowcharts of FIGS. 6, 11, 12, and 16 as dedicated logic circuits to perform the operations corresponding to those software instructions in a dedicated manner analogous to an ASIC. Therefore, the FPGA circuitry 1900 may perform the operations corresponding to the some or all of the machine readable instructions of FIGS. 6, 11, and 12, faster than the general purpose microprocessor can execute the same.

In the example of FIG. 19, the FPGA circuitry 1900 is structured to be programmed (and/or reprogrammed one or more times) by an end user by a hardware description language (HDL) such as Verilog. The FPGA circuitry 1900 of FIG. 19, includes example input/output (I/O) circuitry 1902 to obtain and/or output data to/from example configuration circuitry 1904 and/or external hardware (e.g., external hardware circuitry) 1906. For example, the configuration circuitry 1904 may implement interface circuitry that may obtain machine readable instructions to configure the FPGA circuitry 1900, or portion(s) thereof. In some such examples, the configuration circuitry 1904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1906 may implement the microprocessor 1800 of FIG. 18. The FPGA circuitry 1900 also includes an array of example logic gate circuitry 1908, a plurality of example configurable interconnections 1910, and example storage circuitry 1912. The logic gate circuitry 1908 and interconnections 1910 are configurable to instantiate one or more operations that may correspond to at least some of the machine readable instructions of FIGS. 6, 11, 12, and 16 and/or other desired operations. The logic gate circuitry 1908 shown in FIG. 19 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1908 to enable configuration of the electrical structures and/or the logic gates to form circuits to perform desired operations. The logic gate circuitry 1908 may include other electrical structures such as look-up tables (LUTs), registers (e.g., flip-flops or latches), multiplexers, etc.

The interconnections 1910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1908 to program desired logic circuits.

The storage circuitry 1912 of the illustrated example is structured to store result(s) of the one or more of the operations performed by corresponding logic gates. The storage circuitry 1912 may be implemented by registers or the like. In the illustrated example, the storage circuitry 1912 is distributed amongst the logic gate circuitry 1908 to facilitate access and increase execution speed.

The example FPGA circuitry 1900 of FIG. 19 also includes example Dedicated Operations Circuitry 1914. In this example, the Dedicated Operations Circuitry 1914 includes special purpose circuitry 1916 that may be invoked to implement commonly used functions to avoid the need to program those functions in the field. Examples of such special purpose circuitry 1916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1900 may also include example general purpose programmable circuitry 1918 such as an example CPU 1920 and/or an example DSP 1922. Other general purpose programmable circuitry 1918 may additionally or alternatively be present such as a GPU, an XPU, etc., that can be programmed to perform other operations.

Although FIGS. 18 and 19 illustrate two example implementations of the processor circuitry 1712 of FIG. 17 and/or the processor circuitry 712 of FIG. 7, many other approaches are contemplated. For example, as mentioned above, modern FPGA circuitry may include an on-board CPU, such as one or more of the example CPU 1920 of FIG. 19. Therefore, the processor circuitry 1712 of FIG. 17 and/or the processor circuitry 712 of FIG. 7 may additionally be implemented by combining the example microprocessor 1800 of FIG. 18 and the example FPGA circuitry 1900 of FIG. 19. In some such hybrid examples, a first portion of the machine readable instructions represented by the flowchart of FIGS. 6, 11, and 12 may be executed by one or more of the cores 1802 of FIG. 18, a second portion of the machine readable instructions represented by flowcharts of FIGS. 6, 11, 12, and 16 may be executed by the FPGA circuitry 1900 of FIG. 19, and/or a third portion of the machine readable instructions represented by the flowcharts of FIGS. 6, 11, 12, and 16 may be executed by an ASIC. It should be understood that some or all of the circuitry of FIGS. 5 and/or 10 may, thus, be instantiated at the same or different times. Some or all of the circuitry may be instantiated, for example, in one or more threads executing concurrently and/or in series. Moreover, in some examples, some or all of the circuitry of FIGS. 5 and/or 10 may be implemented within one or more virtual machines and/or containers executing on the microprocessor.

In some examples, the processor circuitry 1712 of FIG. 17 and/or the processor circuitry 712 of FIG. 7 may be in one or more packages. For example, the microprocessor circuitry 1800 of FIG. 18 and/or the FPGA circuitry 1900 of FIG. 19 may be in one or more packages. In some examples, an XPU may be implemented by the processor circuitry 1712 of FIG. 17 and/or the processor circuitry 712 of FIG. 7, which may be in one or more packages. For example, the XPU may include a CPU in one package, a DSP in another package, a GPU in yet another package, and an FPGA in still yet another package.

From the foregoing, it will be appreciated that example methods, systems, apparatus, and articles of manufacture have been disclosed to allow a steering wheel to be centered. For example, a steering position sensor in the steering column can be used to determine whether the steering wheel is centered by using an existing external angle controller (EAC) in an electrical power steering system. For example, while the EAC can be used to rapidly move the steering wheel back to a center position, the steering angle can be measured again to identify a steering angle difference once the EAC has been disabled. In the examples disclosed herein, the EAC can be used to ramp the steering wheel to the opposite of an identified angle difference (e.g., an offset of 10 degrees would result in the EAC ramping the steering wheel to −10 degrees). As such, the steering wheel can remain centered once EAC is disabled again. The methods and apparatus disclosed herein thereby permit a steering wheel to remain centered once actuators have been disengaged and forces are no longer provided to hold the steering position in place. Similarly, the methods and apparatus disclosed herein enable the road wheels of a vehicle to be returned to a straightly forward position once actuators have been disengaged and forces are no longer provided to hold the steering position in place.

Accordingly, the methods and apparatus disclosed herein can be used to correct steering position resulting from load changes (e.g., tire deformation) that can cause a steering wheel to move off-center when power steering is no longer engaged to hold the steering wheel position in the center.

The following paragraphs provide various examples and combinations of the examples disclosed herein:

Example methods, apparatus, systems, and articles of manufacture to methods and apparatus to center a steering wheel and move driving wheels to a straight forward position are disclosed herein. Further examples and combinations thereof include the following:

Example 1 includes a vehicle comprising a steering assistance system, an axle including a wheel, memory, and a processor to execute instructions to identify a first position of the wheel, detect a request to move the wheel to a second position, adjust the wheel from the first position to the second position via the steering assistance system, disengage the steering assistance system, the disengagement of the steering assistance system to cause the wheel to move to a third position, the third position offset from the second position by an angular offset in a first direction, adjust the wheel to a fourth position, the fourth position offset from the second position by the angular offset in a second direction different than the first direction, and disengage the steering assistance system, the disengagement of the steering assistance system to cause the wheel to move to the second position.

Example 2 includes the vehicle of example 1, wherein the second position is a straightly forward position.

Example 3 includes the vehicle of example 1, wherein the processor further executes the instructions to generate the request in response to detecting a parking event.

Example 4 includes the vehicle of example 1, wherein the steering assistance system includes an external angle controller.

Example 5 includes the vehicle of example 1, wherein the processor further executes the instructions to detect a cycle request to cycle the wheel, determine the second position based on a starting position of the wheel, and cycle the wheel.

Example 6 includes the vehicle of example 1, wherein the vehicle is at least one of a partially autonomous vehicle or a fully autonomous vehicle.

Example 7 includes the vehicle of example 1, further including a position sensor disposed on at least one of a steering column or a pinion of a steering rack.

Example 8 includes a method comprising identifying a first position of a road wheel of a vehicle, detecting a request to move the road wheel to a second position, adjusting the road wheel from the first position to the second position via a steering assistance system, disengaging the steering assistance system, the disengagement of the steering assistance system to cause the road wheel to move to a third position, the third position offset from the second position by an angular offset in a first direction, adjusting the road wheel to a fourth position, the fourth position offset from the second position by the angular offset in a second direction different than the first direction, and disengaging the steering assistance system, the disengagement of the steering assistance system to cause the road wheel to move to the second position.

Example 9 includes the method of example 8, wherein the second position is a straightly forward position.

Example 10 includes the method of example 8, further including generating the request in response to detecting a parking event.

Example 11 includes the method of example 8, wherein at least one of (1) the adjusting the road wheel from the first position to the second position via the steering assistance system or (2) adjusting the road wheel to the fourth position, the fourth position offset from the second position by the angular offset in the second direction different than the first direction is performed via an external angle controller.

Example 12 includes the method of example 8, further including detecting a cycle request to cycle the road wheel, determining the second position based on a starting position of the road wheel, and cycling the road wheel.

Example 13 includes the method of example 11, wherein the vehicle is at least one of a partially autonomous vehicle or a fully autonomous vehicle.

Example 14 includes a non-transitory computer readable storage medium comprising instructions that, when executed, cause a processor to at least identify a first position of a road wheel of a vehicle, detect a request to move the road wheel to a second position, adjust the road wheel from the first position to the second position via a steering assistance system, disengage the steering assistance system, the disengagement of the steering assistance system to cause the road wheel to move to a third position, the third position offset from the second position by an angular offset in a first direction, adjust the road wheel to a fourth position, the fourth position offset from the second position by the angular offset in a second direction different than the first direction, and disengage the steering assistance system, the disengagement of the steering assistance system to cause the road wheel to move to the second position.

Example 15 includes the non-transitory computer readable storage medium of example 14, wherein the second position is a straightly forward position.

Example 16 includes the non-transitory computer readable storage medium of example 14, wherein the instructions, when executed, further cause the processor to generate the request in response to a detecting a parking event.

Example 17 includes the non-transitory computer readable storage medium of example 14, wherein at least one of (1) the adjustment of the road wheel from the first position to the second position via the steering assistance system or (2) adjustment of the road wheel to the fourth position, the fourth position offset from the second position by the angular offset in the second direction different than the first direction is performed via an external angle controller.

Example 18 includes the non-transitory computer readable storage medium of example 14, wherein the instructions, when executed, further cause the processor to detect a cycle request to cycle the road wheel, determine the second position based on a starting position of the road wheel, and cycle the road wheel.

Example 19 includes the non-transitory computer readable storage medium of example 15, wherein the vehicle is at least one of a partially autonomous vehicle or a fully autonomous vehicle.

Example 20 includes the non-transitory computer readable storage medium of example 15, wherein the instructions, when executed, further cause the processor to access data from a position sensor associated with the road wheel, the position sensor disposed on at least one of a steering column or a pinion of a steering rack.

Example 21 includes a vehicle comprising a steering system, a steering assist system, an axle including a wheel, memory, and a processor to execute instructions to detect a request to move the wheel to a first rotational position, the wheel having a second rotational position, actuate, via the steering assist system, the wheel towards the first rotational position, determine, based on a relationship between a first parameter and a second parameter, a third rotational position, the third rotational position having an angular offset from the first rotational position, the first parameter corresponding to a position of the steering system, the second parameter corresponding to a load on the steering system, and in response to reaching the third rotational position, disengage the steering assist system, the disengagement causing the wheel to rotate to the first rotational position.

Example 22 includes the vehicle of example 21, wherein the first parameter includes at least one of a pinion angle, a motor angle, or a steering rack displacement.

Example 23 includes the vehicle of example 21, wherein the second parameter includes a first load on a tie rod, a torque of a power steering motor, a current of the power steering motor, or a second load on a steering rack.

Example 24 includes the vehicle of example 21, wherein the processor is to execute instructions to determine the third rotational position during the actuation of the wheel towards the first rotational position.

Example 25 includes the vehicle of example 24, wherein the processor is to execute instructions to determine an angular displacement during the actuation of the wheel towards the first rotational position, wherein the relationship between the first parameter and the second parameter changes from a first relationship to a second relationship, and wherein determination of the third rotational position includes setting the angular offset equal in magnitude to the angular displacement.

Example 26 includes the vehicle of example 21, wherein the wheel includes a tire and the vehicle further including a suspension system, a steering rack, the angular offset compensating for residual forces associated with at least a first position of the steering rack, a second position of the suspension system, or a third position of the tire.

Example 27 includes the vehicle of example 1, wherein the first rotational position is a straightly forward position. Although certain example methods, systems, apparatus, and articles of manufacture have been disclosed herein, the scope of coverage of this patent is not limited thereto. On the contrary, this patent covers all methods, apparatus, systems, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A vehicle comprising:
a steering assistance system;
an axle including a wheel;
memory; and
a processor to execute instructions to:
identify a first position of the wheel;
detect a request to move the wheel to a second position;
adjust the wheel from the first position to the second position via the steering assistance system;
disengage the steering assistance system, the disengagement of the steering assistance system to cause the wheel to move to a third position, the third position offset from the second position by an angular offset in a first direction;
adjust the wheel to a fourth position, the fourth position offset from the second position by the angular offset in a second direction different than the first direction; and
disengage the steering assistance system, the disengagement of the steering assistance system to cause the wheel to move to the second position.

2. The vehicle of claim 1, wherein the second position is a straightly forward position.

3. The vehicle of claim 1, wherein the processor further executes the instructions to generate the request in response to detecting a parking event.

4. The vehicle of claim 1, wherein the steering assistance system includes an external angle controller.

5. The vehicle of claim 1, wherein the processor further executes the instructions to:
detect a cycle request to cycle the wheel;
determine the second position based on a starting position of the wheel; and
cycle the wheel.

6. The vehicle of claim 1, wherein the vehicle is at least one of a partially autonomous vehicle or a fully autonomous vehicle.

7. The vehicle of claim 1, further including a position sensor disposed on at least one of a steering column or a pinion of a steering rack.

8. A method comprising:
identifying a first position of a road wheel of a vehicle;
detecting a request to move the road wheel to a second position;
adjusting the road wheel from the first position to the second position via a steering assistance system;
disengaging the steering assistance system, the disengagement of the steering assistance system to cause the road wheel to move to a third position, the third position offset from the second position by an angular offset in a first direction;
adjusting the road wheel to a fourth position, the fourth position offset from the second position by the angular offset in a second direction different than the first direction; and
disengaging the steering assistance system, the disengagement of the steering assistance system to cause the road wheel to move to the second position.

9. The method of claim 8, wherein the second position is a straightly forward position.

10. The method of claim 8, further including generating the request in response to detecting a parking event.

11. The method of claim 8, wherein at least one of (1) the adjusting the road wheel from the first position to the second position via the steering assistance system or (2) adjusting the road wheel to the fourth position, the fourth position offset from the second position by the angular offset in the second direction different than the first direction is performed via an external angle controller.

12. The method of claim 8, further including:
detecting a cycle request to cycle the road wheel;
determining the second position based on a starting position of the road wheel; and
cycling the road wheel.

13. The method of claim 11, wherein the vehicle is at least one of a partially autonomous vehicle or a fully autonomous vehicle.

14. A non-transitory computer readable storage medium comprising instructions that, when executed, cause a processor to at least:
identify a first position of a road wheel of a vehicle;
detect a request to move the road wheel to a second position;
adjust the road wheel from the first position to the second position via a steering assistance system;
disengage the steering assistance system, the disengagement of the steering assistance system to cause the road wheel to move to a third position, the third position offset from the second position by an angular offset in a first direction;
adjust the road wheel to a fourth position, the fourth position offset from the second position by the angular offset in a second direction different than the first direction; and
disengage the steering assistance system, the disengagement of the steering assistance system to cause the road wheel to move to the second position.

15. The non-transitory computer readable storage medium of claim 14, wherein the second position is a straightly forward position.

16. The non-transitory computer readable storage medium of claim 14, wherein the instructions, when executed, further cause the processor to generate the request in response to a detecting a parking event.

17. The non-transitory computer readable storage medium of claim 14, wherein at least one of (1) the adjustment of the road wheel from the first position to the second position via the steering assistance system or (2) adjustment of the road wheel to the fourth position, the fourth position offset from the second position by the angular offset in the second direction different than the first direction is performed via an external angle controller.

18. The non-transitory computer readable storage medium of claim 14, wherein the instructions, when executed, further cause the processor to:
   detect a cycle request to cycle the road wheel;
   determine the second position based on a starting position of the road wheel; and
   cycle the road wheel.

19. The non-transitory computer readable storage medium of claim 15, wherein the vehicle is at least one of a partially autonomous vehicle or a fully autonomous vehicle.

20. The non-transitory computer readable storage medium of claim 15, wherein the instructions, when executed, further cause the processor to access data from a position sensor associated with the road wheel, the position sensor disposed on at least one of a steering column or a pinion of a steering rack.

* * * * *